(12) United States Patent
Ichimura

(10) Patent No.: US 12,081,960 B2
(45) Date of Patent: Sep. 3, 2024

(54) TRANSMISSION DEVICE, TRANSMISSION METHOD, RECEPTION DEVICE, AND RECEPTION METHOD

(71) Applicant: SONY GROUP CORPORATION, Tokyo (JP)

(72) Inventor: Gen Ichimura, Tokyo (JP)

(73) Assignee: SONY GROUP CORPORATION, Tokyo (JP)

(*) Notice: Subject to any disclaimer, the term of this patent is extended or adjusted under 35 U.S.C. 154(b) by 237 days.

(21) Appl. No.: 17/636,653

(22) PCT Filed: Jul. 17, 2020

(86) PCT No.: PCT/JP2020/027914
§ 371 (c)(1),
(2) Date: Feb. 18, 2022

(87) PCT Pub. No.: WO2021/039189
PCT Pub. Date: Mar. 4, 2021

(65) Prior Publication Data
US 2022/0303706 A1  Sep. 22, 2022

(30) Foreign Application Priority Data

Aug. 30, 2019  (JP) .................................. 2019-157954

(51) Int. Cl.
*G10L 19/00* (2013.01)
*G10L 19/012* (2013.01)
(Continued)

(52) U.S. Cl.
CPC ............ *H04S 7/302* (2013.01); *G10L 19/012* (2013.01); *G10L 19/167* (2013.01); *H04S 7/40* (2013.01)

(58) Field of Classification Search
CPC ......... H04S 7/302; H04S 7/40; G10L 19/012; G10L 19/167
(Continued)

(56) References Cited

U.S. PATENT DOCUMENTS

| 2011/0280307 | A1* | 11/2011 | MacInnis | ............ H04N 5/44504 375/240.15 |
| 2015/0332685 | A1 | 11/2015 | Bleidt | |
| 2019/0005968 | A1* | 1/2019 | Ichimura | ................ G10L 19/167 |

FOREIGN PATENT DOCUMENTS

| AR | 096574 A1 | 1/2016 |
| CA | 2898567 A1 | 7/2014 |

(Continued)

OTHER PUBLICATIONS

International Search Report and Written Opinion of PCT Application No. PCT/JP2020/027914, issued on Sep. 24, 2020, 09 pages of ISRWO.

*Primary Examiner* — William J Deane, Jr.
(74) *Attorney, Agent, or Firm* — CHIP LAW GROUP

(57) ABSTRACT

Provided is a transmission device that sequentially transmits an audio signal in which predetermined units are arranged successively to the reception side through a predetermined transmission line. For example, the audio signal of each predetermined unit is a mixture signal of a compression audio signal and a linear PCM signal. Further, for example, in the audio signal in which the predetermined units are arranged successively, an audio signal of predetermined units including a compressed audio signal and an audio signal of predetermined units including a linear PCM signal are arranged alternately. To the audio signal, reproduction control information for controlling, at the reception side, reproduction of the compressed audio signal and/or the linear PCM signal is added.

19 Claims, 34 Drawing Sheets

(51) Int. Cl.
*G10L 19/16* (2013.01)
*H04S 7/00* (2006.01)

(58) Field of Classification Search
USPC .............................................. 381/17, 21–22
See application file for complete search history.

(56) References Cited

FOREIGN PATENT DOCUMENTS

| | | | |
|---|---|---|---|
| CN | 105190750 | A | 12/2015 |
| EP | 2948947 | A1 | 12/2015 |
| ES | 2628153 | T3 | 8/2017 |
| JP | 2009-122609 | A | 6/2009 |
| JP | 2009-130606 | A | 6/2009 |
| JP | 2016-509693 | A | 3/2016 |
| KR | 10-2015-0109418 | A | 10/2015 |
| MX | 2015009534 | A | 10/2015 |
| RU | 2015136531 | A | 3/2017 |
| TW | 201438003 | A | 10/2014 |
| WO | 2014/114781 | A1 | 7/2014 |

\* cited by examiner

LEVEL BEING ADJUSTED

KARAOKE MODE

ENGLISH SPEECH

LEVEL LOWERING BEING OPERATED

FIG. 6

HDMI PIN ARRAY (IN CASE OF Type-A)

| PIN | Signal Assignment | PIN | Signal Assignment |
|---|---|---|---|
| 1 | TMDS Data2+ | 2 | TMDS Data2 Shield |
| 3 | TMDS Data2− | 4 | TMDS Data1+ |
| 5 | TMDS Data1 Shield | 6 | TMDS Data1− |
| 7 | TMDS Data0+ | 8 | TMDS Data0 Shield |
| 9 | TMDS Data0− | 10 | TMDS Clock+ |
| 11 | TMDS Clock Shield | 12 | TMDS Clock− |
| 13 | CEC | 14 | Reserved (N.C. on device) |
| 15 | SCL | 16 | SDA |
| 17 | DDC/CEC Ground | 18 | +5V Power |
| 19 | Hot Plug Detect | | |

FIG. 12

| PREAMBLE | CHANNEL CODING | | |
|---|---|---|---|
| | | | SUBFRAME #1, BLOCK START |
| "B" | 11101000 | 00010111 | |
| | | | SUBFRAME #1 |
| "M" | 11100010 | 00011101 | |
| | | | SUBFRAME #2 |
| "W" | 11100100 | 00011011 | |
| | 0 | 1 | |
| | (LAST STATE) | | |

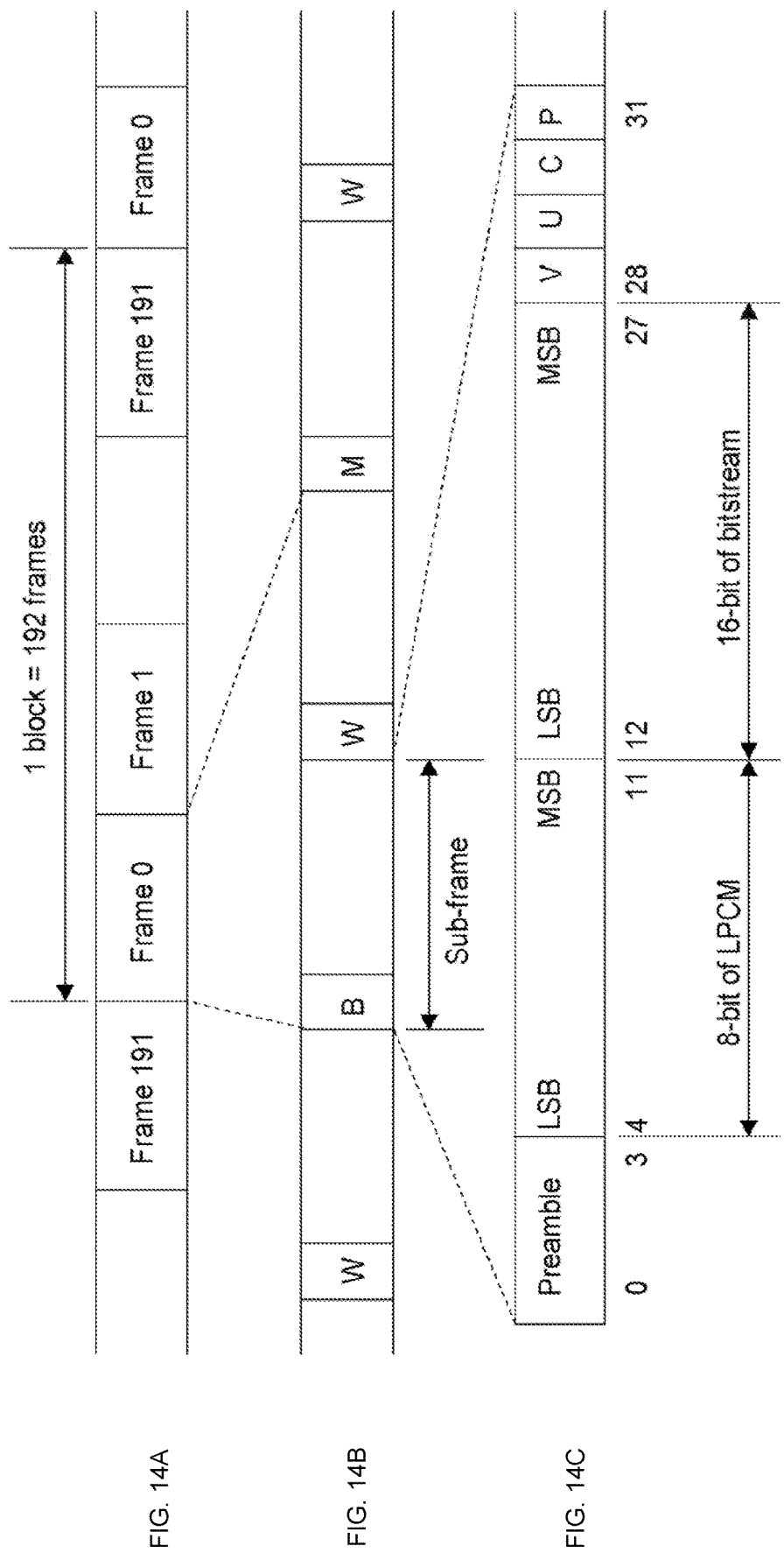

FIG. 15

|     | 0 | 1 | 2 | 3 | 4 | 5 | 6 | 7 |
|-----|---|---|---|---|---|---|---|---|
| 0   | a="0" | b="1" | c | | d="100" | | Mode="00" | |
| 1   | | | | | | | | |
| 2   | | | | | | | | |
| 3   | | | | | | | | |
| 4   | | | | | | | | |
| 5   | | | | | | | | |
| 6   | 49 | 50 | 51 | 52 | 53 | 54 | 55 | |
|     | Multichannel Configuration Type: "0 0 0 0": No information ... "1 1 1 1": IEC 61937-1 configuration | | | | | | | |
| 7   | 56 | 57 | 58 | 59 | 60 | 61 | 62 | |
|     | Multichannel configuration value (MCV) | | | | Compressed Audio Playback level "0 0": no information "0 1": -10 dB "1 0": 0 dB "1 1": replace Centre channel | | | |
| ... | | | | | | | | |
| 22  | | | | | | | | |
| 23  | | | | | | | | 191 |

F I G. 16

| Multichannel configuration value (MCV) | configuration |
|---|---|
| 00000000 | No information |
| 10000000 | 8-bit LPCM 2 channel |
| 01000000 | 8-bit LPCM Stereo 2 channels |
| 00100000 | 16-bit LPCM 1 channel |
| 10100000 | 16-bit LPCM 2 channels |
| 01100000 | 16-bit LPCM Stereo 2 channels |
| 11100000 | 16-bit LPCM 4 channels |

FIG.19

| IEC 60958-1 preamble | IEC 60958-1 channel | AUDIO CHANNEL | STREAM |
|---|---|---|---|
| B | 1 | L ch | 2ch LPCM |
| W | 2 | R ch | |
| M | 1 | L ch | 5.1ch LPCM |
| W | 2 | R ch | |
| M | 1 | C ch | |
| W | 2 | LFE ch | |
| M | 1 | Ls ch | |
| W | 2 | Rs ch | |
| M | 1 | L ch | 2ch LPCM |
| W | 2 | R ch | |

FIG. 21

| bit | 0 | 1 | 2 | 3 | 4 | 5 | 6 | 7 |
|---|---|---|---|---|---|---|---|---|
| | 0 | 1 | 2 | 3 | 4 | 5 | 6 | 7 |
| 0 | a="0" | b="1" | c | d="100" | | | Mode="00" | |
| 1 | | | | | | | | |
| 2 | | | | | | | | |
| 3 | | | | | | | | |
| 4 | | | | | | | | |
| 5 | | | | | | | | |
| 6 | 49 | 50 | 51 | 52 | 53 | 54 | 55 | |
| | Multichannel Configuration Type: "0 0 0 0": No information … "1 1 1 1": Subframe configuration | | | | | | | |
| 7 | 56 | 57 | 58 | 59 | 60 | 61 | 62 | |
| | Subframe configuration value (SCV) | | | | | Compressed Audio Playback level "0 0": no information "0 1": −10 dB "1 0": 0 dB "1 1": replace Centre channel | | |
| … | | | | | | | | |
| 22 | | | | | | | | |
| 23 | | | | | | | | 191 |

FIG.22

| Subframe configuration value (SCV) | configuration |
|---|---|
| 00000000 | No information |
| 10000000 | Mono LPCM |
| 01000000 | 2ch Stereo LPCM |
| 00100000 | 5.1ch LPCM |
| 10100000 | 7.1ch LPCM |

FIG. 23

TRANSMISSION RATE: 48 kHz

"mono LPCM"   BLOCK START

FIG. 24

TRANSMISSION RATE: 96 kHz

"2ch Stereo LPCM"   BLOCK START

FIG. 25

TRANSMISSION RATE: 96 kHz

"mono LPCM"       BLOCK START

| M | A Channel | W | B Channel | B | A Channel | W | B Channel | M | A Channel | W | B Channel | M | A Channel | W |
|---|---|---|---|---|---|---|---|---|---|---|---|---|---|---|
| | IEC 61937 Compressed | | Not used | | IEC 61937 Compressed | | IEC 60958 LPCM mono | | IEC 61937 Compressed | | Not used | | IEC 61937 Compressed | | IEC 60958 LPCM mono | | IEC 61937 Compressed |

FIG. 28

| | 0 | 1 | 2 | 3 | 4 | 5 | 6 | 7 |
|---|---|---|---|---|---|---|---|---|
| 0 | a="0" | b="1" | c | | d="100" | | Mode="00" | |
| 1 | | | | | | | | |
| 2 | | | | | | | | |
| 3 | | | | | | | | |
| 4 | | | | | | | | |
| 5 | | | | | | | | |
| 6 | 49 | | 50 | 51 | 52 | 53 | 54 | 55 |
| 7 | 56 | 57 | 58 | 59 | 60 | 61 | 62 | |
| ... | | | | | | | | |
| 22 | | | | | | | | |
| 23 | | | | | | | | 191 |

Row 6 (bytes 49–55): Multistream Configuration Type: "0 0 0 0": No information ... "1 1 1 0": IEC 61937-1 multistream Row 7 (bytes 56–62): Multichannel configuration value (MCV); Compressed Audio Playback level "0 0": no information, "0 1": -10 dB, "1 0": 0 dB, "1 1": replace Centre channel

FIG. 29

| Multistream configuration value (MCV) | configuration |
|---|---|
| 00000000 | No information |
| 10000000 | 48kHz stream + 48kHz stream |
| 01000000 | 48 kHz stream + 96kHz stream |
| 00100000 | 48kHz stream + 48kHz stream + 48kHz stream |
| 10100000 | 48kHz stream + 48kHz stream + 48kHz stream + 48kHz stream |
| 01100000 | 48kHz LPCM stream + 48kHz stream |
| 11100000 | |

FIG.30

| IEC 60958-1 preamble | IEC 60958-1 channel | DATA PAYLOAD |
|---|---|---|
| B | 1 | 2ch LPCM |
| W | 2 | |
| M | 1 | AC-3 |
| W | 2 | |
| M | 1 | 2ch LPCM |
| W | 2 | |
| M | 1 | AC-3 |
| W | 2 | |
| M | 1 | 2ch LPCM |
| W | 2 | |
| M | 1 | AC-3 |
| W | 2 | |
| M | 1 | 2ch LPCM |
| W | 2 | |
| M | 1 | AC-3 |
| W | 2 | |
| M | 1 | 2ch LPCM |
| W | 2 | |
| | | |
| M | 1 | AC-3 |
| W | 2 | |
| B | 1 | 2ch LPCM |
| W | 2 | |
| M | 1 | AC-3 |
| W | 2 | |

FIG. 31

| | | | | | | | | | | | |
|---|---|---|---|---|---|---|---|---|---|---|---|
| IU 1 | 1 (Start) | 0 | | CRC | | | | | | | |
| IU 2 | 1 (Start) | 0 | | CRC | | IEC 61937-1 ID | | | | | |
| IU 3 | 1 (Start) | 0 | | IEC 61937-1 ID | | | | Byte 1 | | | |
| IU 4 | 1 (Start) | 0 | | Byte 1 | | | | Byte 2 | | | |
| IU 5 | 1 (Start) | 0 | | Byte 2 | | | | Byte 3 | | | |
| IU 6 | 1 (Start) | 0 | | Byte 3 | | | | Byte 4 | | | |
| IU 7 | 1 (Start) | 0 | | Byte 4 | | | | 0 | 0 | 0 | 0 |
| IU 8 | 1 (Start) | 0 | | 0 | 0 | 0 | 0 | 0 | 0 | 0 | 0 |
| IU 9 | 1 (Start) | 0 | 0 | 0 | 0 | 0 | 0 | 0 | 0 | 0 | 0 |
| IU 10 | 1 (Start) | 0 | 0 | 0 | 0 | 0 | 0 | 0 | 0 | 0 | 0 |

FIG. 32

| IEC 61937-1 ID | | |
|---|---|---|
| 10000000: LANGUAGE | Byte 1 | ASCII CHARACTER (ISO 639) |
| | Byte 2 | ASCII CHARACTER (ISO 639) |
| | Byte 3 | ASCII CHARACTER (ISO 639) |
| | Byte 4 | ASCII CHARACTER (ISO 639) |
| 01000000: REPRODUCTION SPEAKER POSITION | Byte 1 | CHANNEL NUMBER |
| | Byte 2 | ANGLE (IEC 62574) |
| | Byte 3 | HEIGHT (IEC 62574) |
| | Byte 4 | DISTANCE (IEC 62574) |

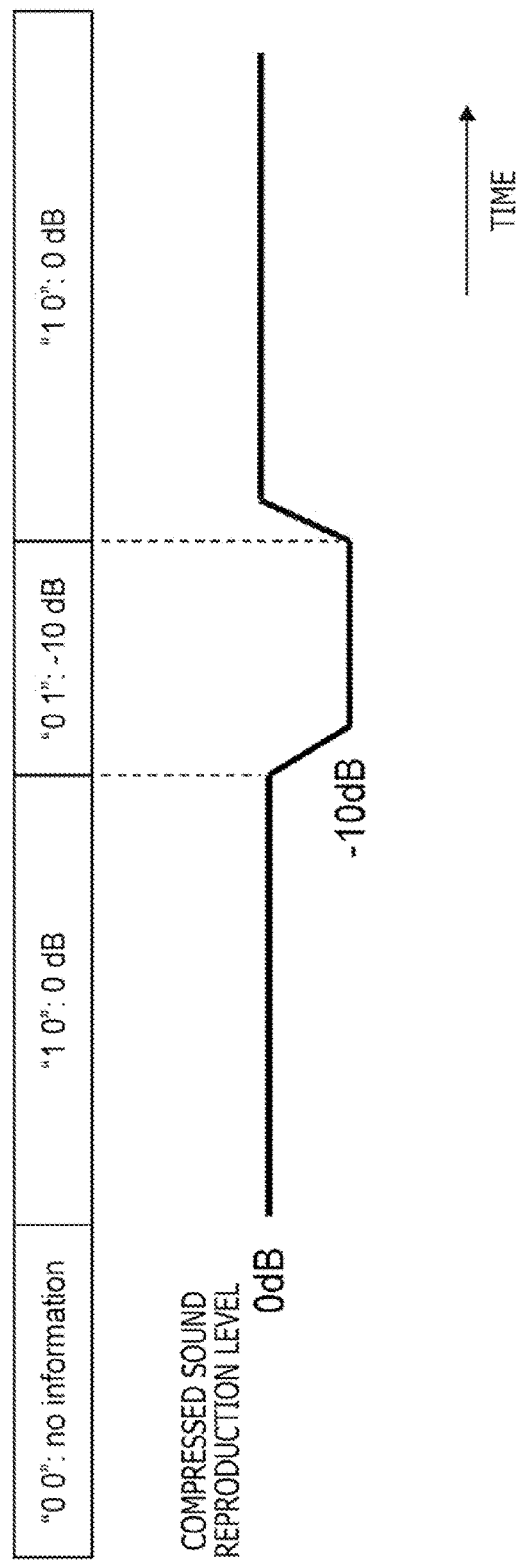

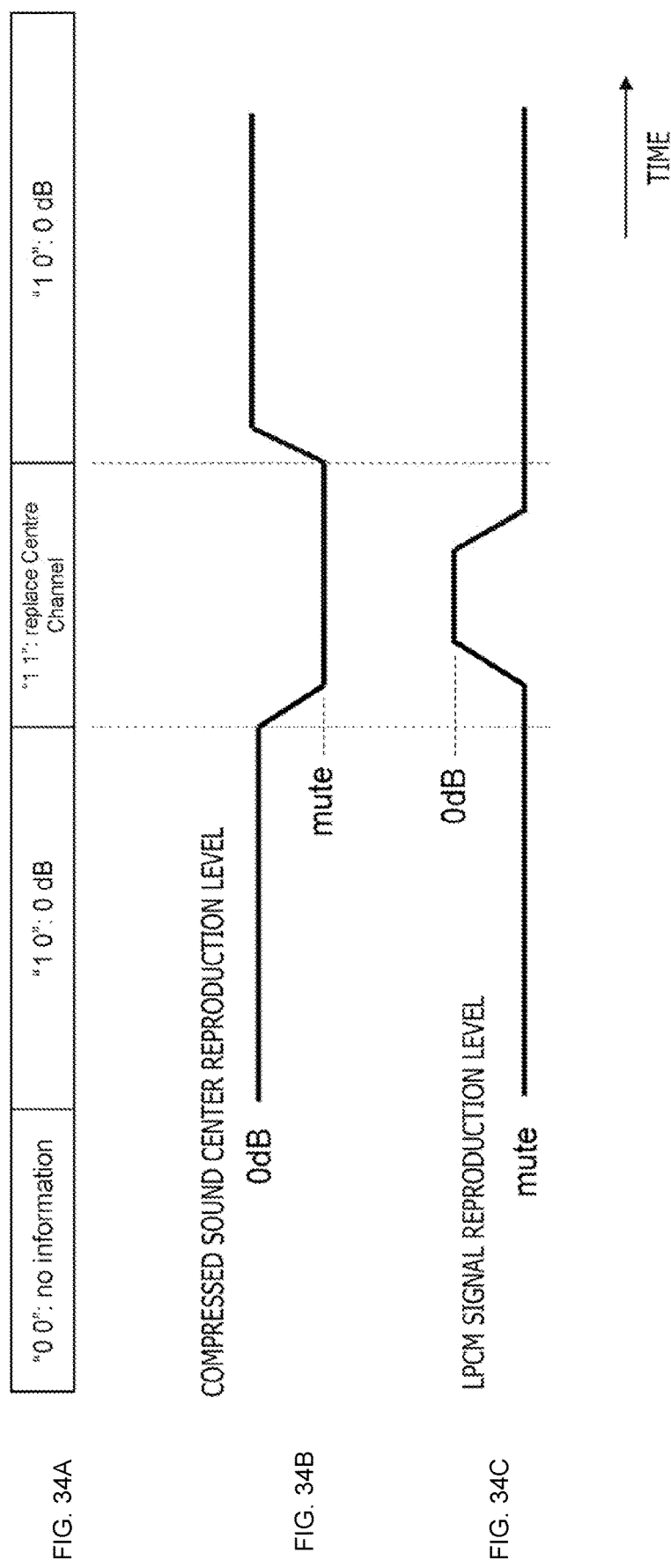

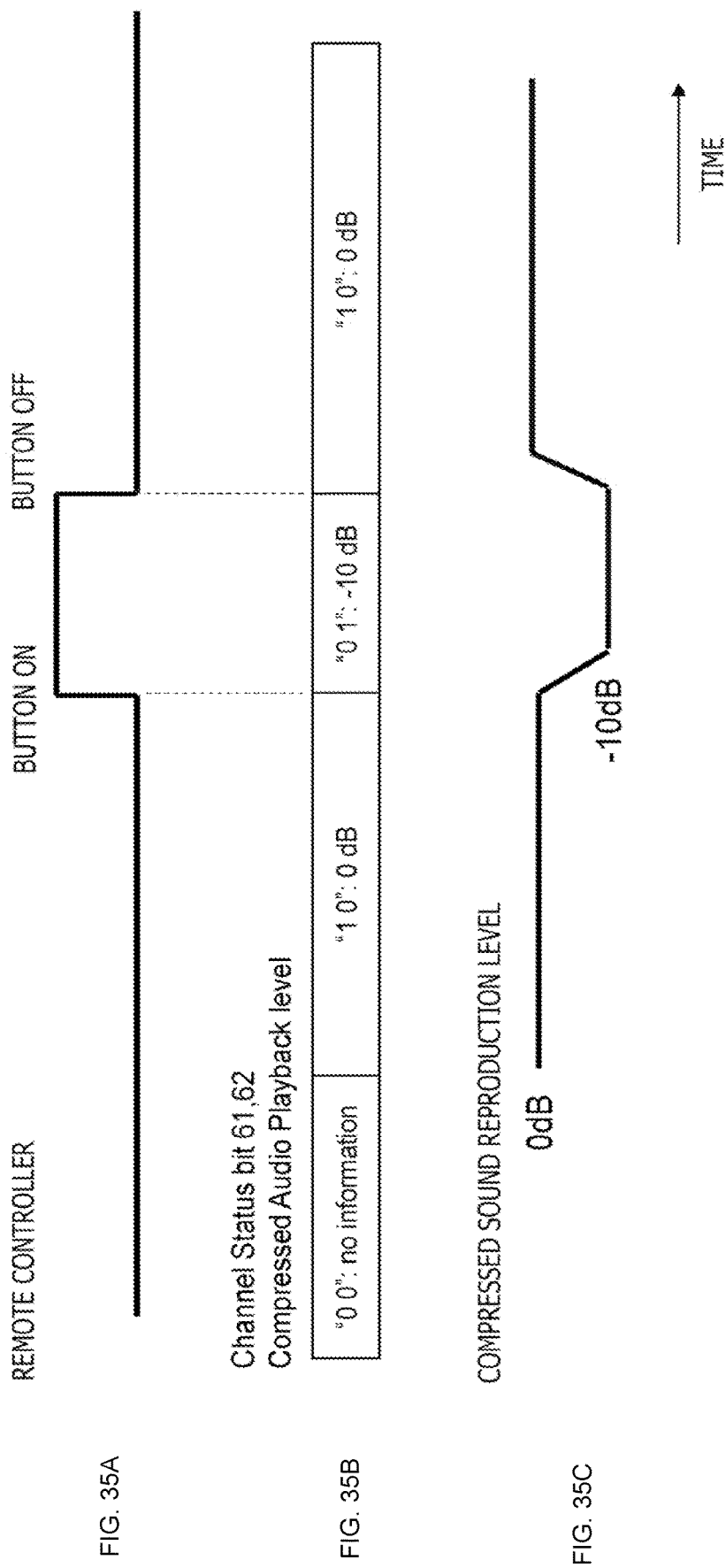

TRANSMISSION DEVICE, TRANSMISSION METHOD, RECEPTION DEVICE, AND RECEPTION METHOD

CROSS REFERENCE TO RELATED APPLICATIONS

This application is a U.S. National Phase of International Patent Application No. PCT/JP2020/027914 filed on Jul. 17, 2020, which claims priority benefit of Japanese Patent Application No. JP 2019-157954 filed in the Japan Patent Office on Aug. 30, 2019. Each of the above-referenced applications is hereby incorporated herein by reference in its entirety.

TECHNICAL FIELD

The present technology relates to a transmission device, a transmission method, a reception device, and a reception method.

BACKGROUND ART

Transmission of a linear PCM signal by the IEC 60958 standard is widely used as a digital audio interface. For example, PTL 1 describes the IEC 60958 standard. Also the IEC 61937 standard that transmits a compressed audio signal on a protocol of the IEC 60958 standard has been widespread and is used in various kinds of audio codec transmission.

The above-mentioned standards are commercially used such that the IEC 60958 protocol is mapped to the formats of a coaxial terminal and an optical out terminal that are called SPDIF (Sony Philips Digital Interface) in actual products, and HDMI (High-Definition Multimedia Interface), the MHL (Mobile High-definition Link), and a display port (DisplayPort) that each are a multimedia interface including a video as well.

CITATION LIST

Patent Literature

[PTL 1]
Japanese Patent Laid-Open No. 2009-130606

SUMMARY

Technical Problem

In a case where a television receiver acts as a transmitter and an audio amplifier acts as a receiver and a reproduction machine, only part of sound of content displayed on a screen of the television receiver is sent to and reproduced by the audio amplifier. For the content, a compression audio codec is normally used, and a technology, such as a multichannel technique or an object audio, that makes it possible to perform high-quality reproduction has been developed. Such codecs require high DSP (Digital Signal Processor) abilities in decoding or require arrangement of a large number of speakers for 5.1 channels or the like.

Therefore, since the load is high in a case where content is decoded and reproduced in the inside of a television receiver, it has been normal that the content is transmitted in a compressed form through a digital audio interface to the audio amplifier such that reproduction of the content is left to the audio amplifier. Also in regard to such content, various forms have increased and, for example, some content is received through a broadcast, some content is inputted to a television receiver through reproduction of a medium such as a Blu-ray Disc, and some content is streamed or downloaded through the Internet.

On the other hand, what requires reproduction of sound in the inside of a television receiver is not limited to content. Response sound of a user interface such as a remote controller, artificial voice synthesis sound by an AI (Artificial Intelligence) function or by a navigation function, and multilingualization (plural languages are originally included in content, or speech is interpreted on the real-time basis in the inside of a television receiver or the like) frequently require the real-time property in comparison with content reproduction. In this case, a linear PCM signal is transmitted to avoid delay by decoding. A similar situation arises also in digital audio transmission between in-vehicle devices in a vehicle.

Here, if transmission of a compressed audio signal and transmission of a linear PCM signal are sequentially switched and reproduced, then the continuity in content reproduction is significantly lost and the reproduction quality is degraded. Although a method of decoding a compressed audio signal and mixing and transmitting it with a linear PCM signal is available, the television receiver does not have a decoding function for all compressed audio signals. Further, since some delay occurs in the process of the decoding and mixture, there is a case in which this is not preferable to an application that requires the real time property described above. For example, in the case of game content, although background music is provided by MPEG-4 AAC, a user cannot play the game comfortably if delay occurs in a linear PCM signal or the like of a response to an operation by the user with a game controller.

In particular, it matters that a digital audio interface method and device that can implement simultaneous transmission and reproduction of a compressed audio signal and a linear PCM signal are not provided. Therefore, only a linear PCM signal is used for speaker reproduction of low quality in a television receiver, for example, and this significantly degrades the quality of the user experience. Further, although the problem can be solved if plural digital audio interfaces are provided and a compressed audio signal and a linear PCM signal are sent to and reproduced by audio amplifiers different from each other, this increases the cost and increases also the cumbersomeness in equipment setting, and the system is thus not affordable for general users.

The applicant of the present application formerly proposed a system that can favorably perform simultaneous transmission and reproduction of a compressed audio signal and a linear PCM signal (Japanese Patent Application No. 2018-098382, Japanese Patent Application No. 2018-098383, and Japanese Patent Application No. 2019-034473).

A compressed audio signal and a linear PCM signal transmitted simultaneously in such a manner are reproduced as sound on the reception side. As a reproduction method for them, a method of reproducing only the compressed audio signal, a method of reproducing only the linear PCM signal, and a method of reproducing the compressed audio signal and the linear PCM signal in a mixed manner are available. As a signal transmitted as the linear PCM signal, for example, alarm sound upon emergency, an announcement, an audio description, interphone sound, and so forth are supposed in addition to mail arrival sound, operation sound of a remote controller, and so forth.

In a case where a compressed audio signal and a linear PCM signal are reproduced in a mixed manner, on the transmission side, it is sometimes desired to perform a process for turning up the sound volume resulting from the linear PCM signal or turning down the sound volume resulting from the compressed audio signal in order to clearly attract attention of a listener. Currently, the linear PCM signal is limited in digital full scale and cannot be leveled up, and the compressed audio signal cannot be subjected to processing of unpacking, leveling down, and recompression on the transmission side and thus cannot be leveled down in many cases. In this case, there is a problem that, on the reception side, both signals are reproduced in a same sound volume and reproduction of them cannot be implemented in good reproduction sound volume balance.

It is an object of the present technology to make it possible that, in a case where a compressed audio signal and a linear PCM signal are transmitted simultaneously, reproduction control of the compressed audio signal and/or the linear PCM signal is favorably performed on the reception side.

Solution to Problem

The concept of the present technology resides in a transmission device including a transmission section that sequentially transmits an audio signal of predetermined units to a reception side through a predetermined transmission line. The audio signal of the predetermined units includes a mixture signal of a compressed audio signal and a linear PCM signal. The transmission device further includes an information addition section that adds, to the audio signal to be transmitted, reproduction control information for the audio signal.

In the present technology, the transmission section sequentially transmits an audio signal of predetermined units to the reception side through the predetermined transmission line. For example, the predetermined transmission line may include a coaxial cable, an optical cable, an Ethernet (IEC 61883-6) cable, an HDMI cable, an MHL cable, or a display port cable.

The audio signal of the predetermined units is a mixture signal of a compressed audio signal and a linear PCM signal. For example, the linear PCM signal may include an audio signal that requires a real time property.

Further, for example, the audio signal of the predetermined units may include an audio signal of subframe units. In this case, in the audio signal of the subframe units, the compressed audio signal may be arranged on an upper bit side, and the linear PCM signal may be arranged on a lower bit side.

The information addition section adds, to the audio signal to be transmitted, reproduction control information for the audio signal. For example, the information addition section may add the reproduction control information with use of a predetermined bit region in each of blocks configured for each predetermined number of the predetermined units. In this case, for example, the predetermined bit region in each of the blocks may include a predetermined bit region of a channel status of each of the blocks.

For example, the reproduction control information may include information for controlling reproduction level adjustment of an audio signal obtained by decoding the compressed audio signal. In this case, by adjusting the reproduction level of an audio signal obtained by decoding the compressed audio signal to a low level, it is possible, for example, to make reproduction sound of the linear PCM signal, which is mixed with the compressed audio signal, stand out for the user.

Further, for example, the reproduction control information may include information for performing control to replace an audio signal of a center channel obtained by decoding the compressed audio signal with the linear PCM signal. In this case, it is possible to make reproduction sound of the linear PCM signal stand out for the user. As the case in which such replacement is to be performed in such a manner, a case in which the language is switched, a case of karaoke, and so forth can be supposed.

Further, for example, the reproduction control information may include information for performing control to lower the reproduction level of an audio signal obtained by decoding the compressed audio signal in response to a predetermined operation by a user. By controlling the compressed audio signal reproduction level to a low level in such a manner, it is possible to temporarily avoid that the reproduction sound of the compressed audio signal bothers the user.

Further, for example, the reproduction control information may include information for controlling such that a sound image according to the linear PCM signal is localized at a position in the proximity of a user. Accordingly, it is possible to make reproduction sound of the linear PCM signal stand out for the user. Note that it is also possible to perform control of the sound image localization in such a manner in parallel to reproduction level adjustment of the compressed audio signal.

Further, for example, the reproduction control information may include information for controlling such that an at-hand speaker of a user is used as a reproduction speaker for the linear PCM signal. Accordingly, it is possible to make reproduction sound of the linear PCM signal stand out for the user. Note that it is also possible to use an at-hand speaker in this manner in parallel to reproduction level adjustment of the compressed audio signal.

As described above, in the present technology, when an audio signal of predetermined units, which is a mixture signal of a compressed audio signal and a linear PCM signal, is to be transmitted sequentially to the reception side through a predetermined transmission line, reproduction control information for the audio signal is added to the audio signal. Therefore, on the reproduction side, reproduction control of the compressed audio signal and/or the linear PCM signal can favorably be performed.

It is to be noted that, in the present technology, for example, the transmission device may further include a display section for displaying information relating to the reproduction control information. Accordingly, the user can confirm what reproduction control is being performed.

Further, in the present technology, for example, the transmission device may further include an information addition section that adds, to the audio signal to be transmitted, identification information that indicates that the audio signal of the predetermined units includes a mixture signal of a compressed audio signal and a linear PCM signal. The identification information is added in such a manner, so that the reception side can easily recognize that the audio signal of the predetermined units is a mixture signal of a compressed audio signal and a linear PCM signal.

Meanwhile, another concept of the present technology resides in a reception device including a reception section that receives an audio signal of predetermined units transmitted sequentially from a transmission side through a predetermined transmission line. The audio signal of the predetermined units including a mixture signal of a compressed audio signal and a linear PCM signal. To the audio signal received, reproduction control information for the audio signal is added. The reception device further includes a reproduction controlling section that controls reproduction of the compressed audio signal and/or the linear PCM signal on the basis of the reproduction control information.

In the present technology, an audio signal of predetermined units is sequentially received from the transmission side through the predetermined transmission line by the reception section. The audio signal of the predetermined units is a mixture signal of a compressed audio signal and a linear PCM signal. Further, the received audio signal has added thereto reproduction control information of the audio signal. By the reproduction controlling section, reproduction of the compressed audio signal and/or the linear PCM signal is controlled on the basis of the reproduction control information.

In such a manner, in the present technology, when an audio signal of predetermined units, which is a mixture signal of a compressed audio signal and a linear PCM signal, is received sequentially from the transmission side through the predetermined transmission line, reproduction of the compressed audio signal and/or the linear PCM signal is controlled on the basis of the reproduction control information added to the received audio signal. Therefore, reproduction control of the compressed audio signal and/or the linear PCM signal can favorably be performed.

It is to be noted that, in the present technology, for example, the reception device may further include a display section for displaying information relating to the reproduction control information. Accordingly, it is possible for the user to confirm what reproduction control is being performed.

BRIEF DESCRIPTION OF DRAWINGS

FIG. 6 is a view depicting pin arrangement of an HDMI connector.

FIG. 12 is a view depicting channel coding of a preamble in the IEC 60958 standard.

FIGS. 14A, 14B and 14C are view depicting an interface format (first method) in a case where a compressed audio signal and a linear PCM signal are transmitted simultaneously.

FIG. 15 is a view schematically depicting a format of a channel status corresponding to the interface format (first method).

FIG. 16 is a view depicting an example of a correspondence relation between values of "Multichannel configuration value (MCV)" and configurations of a linear PCM signal.

FIG. 19 is a view depicting an example of a frame configuration in a case where a stereo 2-channel linear PCM signal and a 5.1-channel linear PCM signal are transmitted.

FIG. 21 is a view schematically depicting a format of a channel status corresponding to the interface format (second method).

FIG. 22 is a view depicting an example of a correspondence relation between values of "Subframe configuration value (SCV)" and configurations of a linear PCM signal.

FIG. 23 is a view depicting an example of a frame configuration in a case where an entire stream is transmitted in 48 KHz and the configuration of the linear PCM signal is "monaural LPCM."

FIG. 24 is a view depicting an example of a frame configuration in a case where an entire stream is transmitted in 96 kHz and the configuration of the linear PCM signal is "2-channel stereo LPCM."

FIG. 25 is a view depicting an example of a frame configuration in a case where an entire stream is transmitted in 96 KHz and the configuration of the linear PCM signal is "monaural LPCM."

FIG. 28 is a view schematically depicting a format of a channel status in a case where plural kinds of audio signals are transmitted simultaneously (third method).

FIG. 29 is a view depicting an example of a correspondence relation between plural kinds of audio signals and configurations.

FIG. 30 is a view depicting an example of a frame configuration in "48 KHz LPCM stream+48 kHz stream."

FIG. 31 is a view depicting an example of a user data message.

FIG. 32 is a view depicting an example of information that has a relation to a linear PCM signal.

FIGS. 33A and 33B depicts views illustrating a particular example in a case in which reproduction level adjustment of a compressed audio signal is performed.

FIGS. 34A, 34B and 34C depicts views illustrating a case in which a center channel of a compressed audio signal is replaced with a linear PCM signal.

FIGS. 35A, 35B and 35C depicts views illustrating a case in which the reproduction level of a compressed audio signal is lowered in response to a predetermined operation by a user.

DESCRIPTION OF EMBODIMENT

In the following, a mode for carrying out the invention (hereinafter referred to as an "embodiment") is described. It is to be noted that the description is given in the following manner.

1. Embodiment
2. Modifications

1. Embodiment

[Example of Configuration of AV System]

Figure 1:
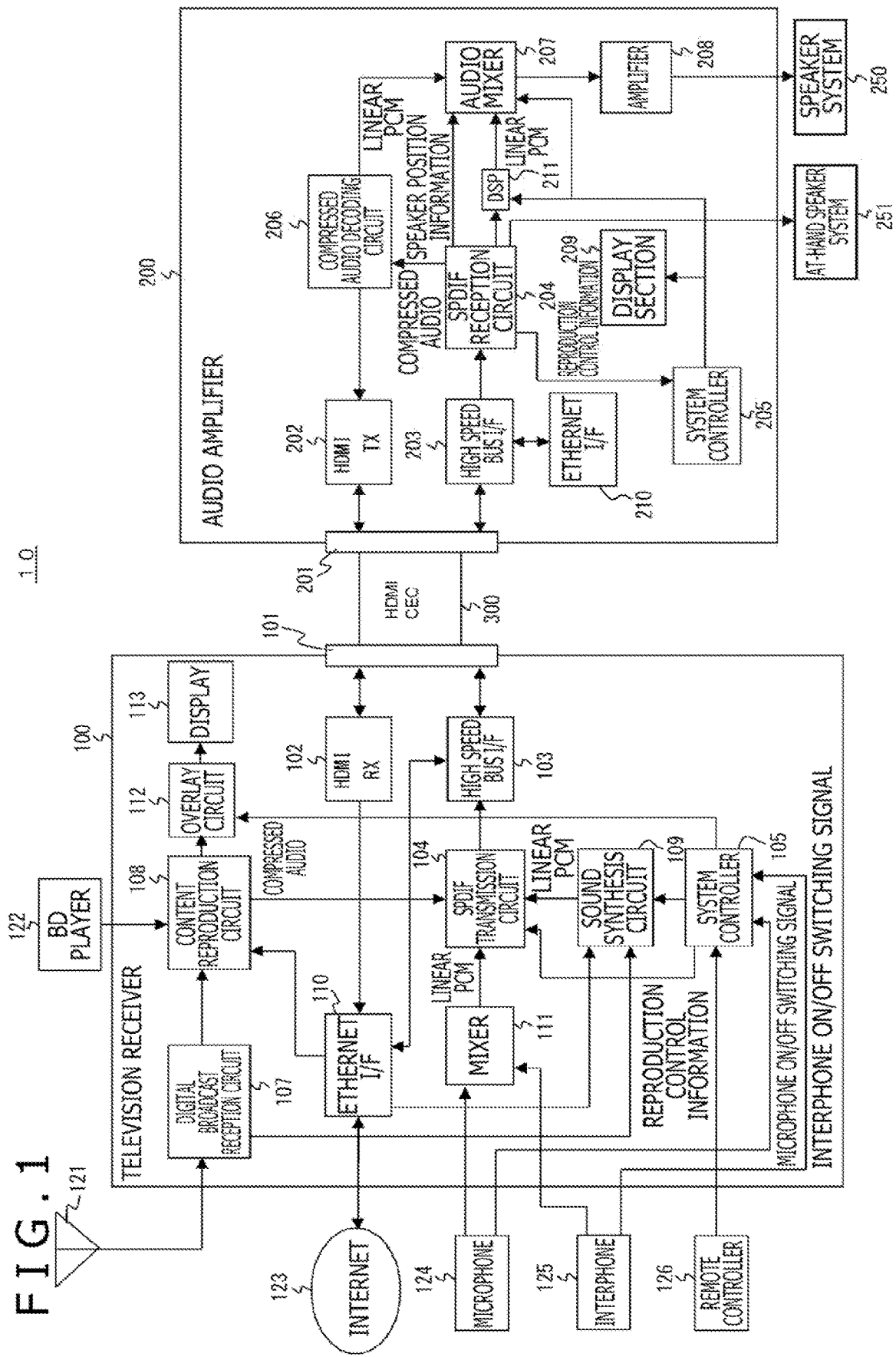
FIG. 1 is a block diagram depicting an example of a configuration of an AV system as an embodiment.

FIG. 1 depicts an example of a configuration of an AV system 10 as an embodiment. The AV system 10 includes a television receiver 100 and an audio amplifier 200.

To the television receiver 100, a reception antenna 121 for a television broadcast, a BD (Blu-ray Disc) player 122, the Internet 123, a microphone 124, an interphone 125, and a remote controller 126 are connected. Meanwhile, to the audio amplifier 200, a 2-channel or multichannel speaker system 250 and an at-hand speaker system 251 placed at hand of a user are connected. It is to be noted that "Blu-ray" is a registered trademark.

The television receiver 100 and the audio amplifier 200 are connected to each other through an HDMI cable 300. It is to be noted that "HDMI" is a registered trademark. In the television receiver 100, an HDMI terminal 101 to which an HDMI reception section (HDMI RX) 102 and a high speed bus interface 103 that configures a communication section are connected is provided. In the audio amplifier 200, an HDMI terminal 201 to which an HDMI transmission section (HDMI TX) 202 and a high speed bus interface 203 that configures a communication section are connected is provided. The HDMI cable 300 is connected at one end thereof to the HDMI terminal 101 of the television receiver 100 and at the other end thereof to the HDMI terminal 201 of the audio amplifier 200.

The television receiver 100 includes the HDMI reception section 102, the high speed bus interface 103, and an SPDIF transmission circuit 104. The television receiver 100 further includes a system controller 105, a digital broadcast reception circuit 107, a content reproduction circuit 108, a sound synthesis circuit 109, an Ethernet interface 110, a mixer 111, an overlay circuit 112, and a display 113. It is to be noted that "Ethernet" is a registered trademark. Further, in the example depicted, components of an image system are omitted suitably in order to simplify the description.

The system controller 105 controls operation of the components of the television receiver 100. To the system controller 105, a remote controller 126 is connected. The user can perform various operation inputs through the remote controller 126. It is to be noted that, in addition to the remote controller 126, as interfaces for allowing the user to perform various operation inputs, for example, a touch panel, a mouse, a keyboard, a gesture inputting section for detecting by a camera an instruction input, a sound inputting section that performs an operation input by voice and so forth are applicable.

The digital broadcast reception circuit 107 processes a television broadcast signal inputted from the reception antenna 121 and outputs a compressed audio signal relating to broadcast content. The Ethernet interface 110 communicates with a different server through the Internet 123. The content reproduction circuit 108 selectively extracts a compressed audio signal of broadcast content obtained by the digital broadcast reception circuit 107, a compressed audio signal of reproduction content supplied from the BD player 122, or a compressed audio signal of internet content obtained at the Ethernet interface 110 and sends the extracted compressed audio signal to the SPDIF transmission circuit 104.

The sound synthesis circuit 109 receives operation sound data according to an operation of the remote controller 126 from the system controller 105 and generates and sends a linear PCM signal of the operation sound to the SPDIF transmission circuit 104. For the linear PCM signal of the operation sound, the real time property is required. Further, the sound synthesis circuit 109 receives notification sound data for notifying a user that a mail is received from the system controller 105 and generates and sends a linear PCM signal of the notification sound to the SPDIF transmission circuit 104. Also for the linear PCM signal of the notification sound, the real time property is required.

Further, the sound synthesis circuit 109 receives subtitle data from the digital broadcast reception circuit 107, generates a linear PCM signal of subtitle sound by subtitle reading software, and sends the generated linear PCM signal to the SPDIF transmission circuit 104. Also for the linear PCM signal of such subtitle sound as just described, the real time property is required. For example, this is a case in which the broadcast content is a foreign movie and the language of speech resulting from the compressed audio signal is a foreign language and besides the subtitle is a Japanese language subtitle or in a like case. It is to be noted that this similarly applies also to a case in which, as regards the subtitle sound, subtitle data relating not to broadcast content but to reproduction content from the BD player 122 exists.

Moreover, the sound synthesis circuit 109 receives text data of translation speech received at the Ethernet interface 110 from a translation server (not depicted in FIG. 1) and generates and sends a linear PCM signal of the translation speech to the SPDIF transmission circuit 104.

Here, the Ethernet interface 110 receives a PCM sound signal of lines in a first language obtained, for example, by a compressed audio decoding circuit 206 of the audio amplifier 200 hereinafter described through the HDMI transmission section 202 of the audio amplifier 200 and the HDMI reception section 102 of the television receiver 100, and transmits a PCM sound signal of the lines in the first language to the translation server, to thereby receive text data of translation speech of the lines in a second language from the translation server.

The microphone 124 is used in a case where karaoke is performed. In this case, a karaoke compressed audio signal is obtained, for example, from the BD player 122. Further, from the microphone 124, a linear PCM signal according to singing of the user is obtained. This linear PCM signal is sent to the SPDIF transmission circuit 104 through the mixer 111. Further, an on/off switching signal of the microphone 124 is supplied to the system controller 105.

From the interphone 125, a linear PCM signal according to utterance of a visitor is obtained. This linear PCM signal is sent to the SPDIF transmission circuit 104 through the mixer 111. Further, an on/off switching signal of the interphone 125 is supplied to the system controller 105.

The HDMI reception section 102 receives data of an image or sound supplied to the HDMI terminal 101 through the HDMI cable 300 by communication in compliance with the HDMI. The high speed bus interface 103 is an interface for a bidirectional communication path configured using a reserve line and an HPD (Hot Plug Detect) line that configure the HDMI cable 300. It is to be noted that details of the HDMI reception section 102 and the high speed bus interface 103 are hereinafter described.

The SPDIF transmission circuit 104 is a circuit for transmitting a digital audio transmission signal (hereinafter referred to as an "SPDIF signal" as appropriate) of the IEC 60958 standard. The SPDIF transmission circuit 104 is a transmission circuit in compliance with the IEC 60958 standard. It is to be noted that details of the SPDIF signal are hereinafter described.

In the present embodiment, the SPDIF transmission circuit 104 transmits a compressed audio signal and a linear PCM signal simultaneously. Here, as a method of transmitting a compressed audio signal and a linear PCM signal simultaneously, a first method, a second method, and a third method are available.

In the case of the first method, an audio signal of subframe units is a mixture signal of a compressed audio signal and a linear PCM signal.

In this case, to the SPDIF signal to be transmitted from the SPDIF transmission circuit 104, identification information indicative of a configuration of the audio signal (an audio signal of subframe units is a mixture signal of a compressed audio signal and a linear PCM signal), configuration information indicative of a configuration of the linear PCM signal, information relating to the linear PCM signal, and so forth are added. The configuration information indicates, for example, a 2-channel configuration of an 8-bit linear PCM signal, a stereo 2-channel configuration of an 8-bit linear PCM signal, a 1-channel configuration of a 16-bit linear PCM signal, or the like. Meanwhile, the information relating to the linear PCM signal is information of, for example, a language, a speaker location, and so forth.

Meanwhile, in the case of the second method, an audio signal in which subframe units are arranged successively is a signal in which an audio signal of subframe units including a compressed audio signal and an audio signal of subframe units including a linear PCM signal are arranged alternately.

In this case, to the SPDIF signal to be transmitted from the SPDIF transmission circuit 104, identification information indicative of a configuration of the audio signal (an audio signal in which subframe units are arranged successively is a signal in which an audio signal of subframe units including a compressed audio signal and an audio signal of subframe units including a linear PCM signal are arranged alternately), configuration information indicative of a configuration of the linear PCM signal, information relating to the linear PCM signal, and so forth are added. The configuration information indicates, for example, a monaural configuration, a stereo 2-channel configuration, a 5.1-channel configuration, a 7.1-channel configuration, or the like. Further, the information relating to the linear PCM signal is information, for example, of a language, a speaker location, and so forth Further, in the case of the third method, an audio signal in a block is a mixture signal of a compressed audio signal and a linear PCM signal.

In this case, to the SPDIF signal transmitted from the SPDIF transmission circuit 104, identification information indicative of a configuration of the audio signal (the audio signal in a block is a mixture signal of a compressed audio signal and a linear PCM signal), configuration information indicative of a configuration of the linear PCM signal, information relating to the linear PCM signal, and so forth are added.

The system controller 105 issues reproduction control information for controlling reproduction of a compressed audio signal and/or a linear PCM signal and sends the reproduction control information to the SPDIF transmission circuit 104. The SPDIF transmission circuit 104 then adds the reproduction control information to an SPDIF signal (audio signal) to be transmitted. In this case, the reproduction control information is added using a predetermined bit region in each block, more particularly, using a predetermined bit region of the channel status of each block.

For example, this reproduction control information is information for controlling reproduction level adjustment of a compressed audio signal (that is, reproduction level adjustment of an audio signal obtained by decoding the compressed audio signal). The system controller 105 issues this information, for example, in a case where a linear PCM signal from the interphone 125, a linear PCM signal of operation sound of the remote controller 126, a linear PCM signal of mail reception notification sound, or the like are to be transmitted simultaneously together with a compressed audio signal. In this case, on the reception side, the reproduction level of an audio signal obtained by decoding the compressed audio signal is adjusted to a low level, and reproduction sound of the linear PCM signal becomes outstanding to the user, by which the reproduction sound can be noticed by the user.

Further, for example, this reproduction control information is information for controlling such that the center channel of a compressed audio signal (in short, an audio signal of the center channel obtained by decoding the compressed audio signal) is replaced with a linear PCM signal. The system controller 105 issues this information in a case where, for example, in a karaoke mode, a linear PCM signal of singing voice from the microphone 124 is to be transmitted simultaneously with a multi-channel compressed audio signal of back performance. In this case, on the reception side, the audio signal of the center channel included in the back performance is replaced with the linear PCM signal, and this makes it possible for the audience to clearly enjoy reproduction sound of the linear PCM signal of the singing voice.

Further, the system controller 105 issues this information in a case where a linear PCM signal of a second translation language are to be transmitted simultaneously with a multi-channel compressed audio signal in which the language of the speech is a first language. In this case, on the reception side, the audio signal of the center channel is replaced with the linear PCM signal, and the user can hear the speech in the second language.

Further, for example, this reproduction control information is information for controlling to lower the reproduction level of the compressed audio signal (in short, the reproduction level of an audio signal obtained by decoding the compressed audio signal) in response to a predetermined operation by the user. The system controller 105 issues this information, for example, in a case where a particular button of the remote controller 126 is operated by the user and the remote controller 126 is thus in an on state. In this case, on the reception side, the reproduction level of the compressed audio signal is lowered, and it is possible to temporarily avoid that the reproduction sound of the compressed audio signal bothers the user.

Figures 2, 3A, 3B, 3C, 3D:
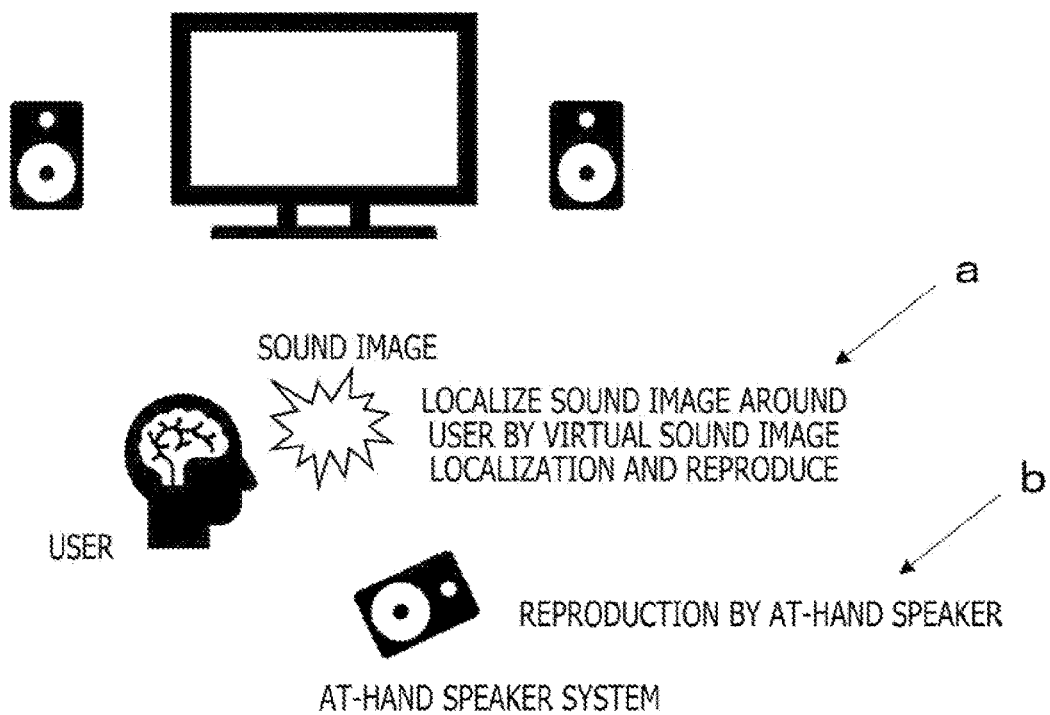
FIG. 2 is a view illustrating control for localizing sound of a linear PCM signal reproduced simultaneously with a compressed audio signal in the proximity of a user and control for setting, as an at-hand speaker of the user, a reproduction speaker for the linear PCM signal reproduced simultaneously with the compressed audio signal.
FIGS. 3A, 3B, 3C and 3D depicts views each depicting an example of display relating to reproduction control information in a television receiver or an audio amplifier.

Further, for example, this reproduction control information is information for controlling such that a sound image by the linear PCM signal is localized at a position in the proximity of the user (refer to an arrow "a" in FIG. 2). Further, for example, this reproduction control information is controlled such that a speaker at hand of the user is used as a reproduction speaker for the linear PCM signal (refer to an arrow "b" in FIG. 2). The system controller 105 issues such information as described above in a case where, for example, a linear PCM signal from the interphone 125, a linear PCM signal of operation sound of the remote controller 126, a linear PCM signal of mail reception notification sound, or the like are to be transmitted simultaneously with the compressed audio signal. In this case, on the reception side, the reproduction sound of the linear PCM signal becomes outstanding to the user, by which the reproduction sound can be noticed by the user.

The display 113 displays an image according to a video signal outputted from the content reproduction circuit 108. The overlay circuit 112 overlays a display signal for performing display relating to the reproduction control information described above with the video signal. This display signal is supplied from the system controller 105.

For example, in a case where the system controller 105 issues information for controlling reproduction level adjustment of an audio signal obtained by decoding the compressed audio signal, in order to notify the user that level adjustment is performed by the audio amplifier 200 side, for example, such display as "Level being adjusted" depicted in FIG. 3A is performed.

Further, for example, in a case where, in a karaoke mode, the system controller 105 issues information for performing control for replacing an audio signal of the center channel obtained by decoding a compressed audio signal with a linear PCM signal, in order to notify the user that the audio signal of the center channel is replaced with a linear PCM signal of singing voice, for example, such display as "Karaoke mode" depicted in FIG. 3B is performed.

Further, for example, in a case where a linear PCM signal of a second translation language is to be transmitted simultaneously with a multi-channel compressed audio signal in which the language of speech is a first language and where the system controller 105 issues information for performing control to replace an audio signal of the first language of the center channel obtained by decoding the compressed audio signal with the linear PCM signal of the second language, in order to notify the user that the audio signal of the center channel is replaced with a linear PCM signal of a different language, for example, such display as "English speech" depicted in FIG. 3C is performed.

Furthermore, for example, in a case where the system controller 105 issues information for performing control to lower the reproduction level of an audio signal obtained by decoding the compressed audio signal in response to a predetermined operation by the user, in order to notify the user that the reproduction level of the compressed audio signal is lowered, such display as "Level lowering being operated" as depicted in FIG. 3D is performed.

Referring back to FIG. 1, the audio amplifier 200 includes the HDMI transmission section 202, the high speed bus interface 203, and an SPDIF reception circuit 204. The audio amplifier 200 further includes a system controller 205, the compressed audio decoding circuit 206, an audio mixer 207, an amplifier 208, a display section 209, an Ethernet interface 210 and a digital signal processor (DSP) 211.

The system controller 205 controls operation of the components of the audio amplifier 200. The HDMI transmission section 202 sends out data of a video (image) and sound of a baseband from the HDMI terminal 201 to the HDMI cable 300 by communication in compliance with the HDMI. The high speed bus interface 203 is an interface for a bidirectional communication path configured using a reserve line and an HPD (Hot Plug Detect) line that configure the HDMI cable 300. It is to be noted that details of the HDMI transmission section 202 and the high speed bus interface 203 are hereinafter described.

The SPDIF reception circuit 204 is a circuit for receiving an SPDIF signal (digital audio signal of the IEC 60958 standard). The SPDIF reception circuit 204 is a reception circuit in compliance with the IEC 60958 standard. The SPDIF reception circuit 204 separates the SPDIF signal on the basis of identification information indicative of a configuration of the audio signal to acquire a compressed audio signal and a linear PCM signal. Further, the SPDIF reception circuit 204 extracts the above-described reproduction control information added to the SPDIF signal and sends the extracted reproduction control information to the system controller 205.

The compressed audio decoding circuit 206 performs a decoding process for the compressed audio signal obtained by the SPDIF reception circuit 204 to obtain a 2-channel or multi-channel linear PCM signal.

The audio mixer 207 mixes a linear PCM signal obtained by the SPDIF reception circuit 204 with a linear PCM signal obtained by the compressed audio decoding circuit 206, on the basis of configuration information indicative of a configuration of the linear PCM signal, to obtain a 2-channel or multi-channel output linear PCM signal.

It is to be noted that the mix process here also includes selection of only one of them. Further, the mixing process here also includes, in a case where plural linear PCM signals are to be transmitted, selection of any one of them.

Here, the audio mixer 207 performs a rendering process such that a PCM sound signal of a channel conforming to the configuration of the speaker system 250 is obtained. Further, in a case where, to a linear PCM signal obtained by the SPDIF reception circuit 204, for example, speaker position information is added as information relating to the linear PCM signal, the audio mixer 207 performs a rendering process such that sound according to the linear PCM signal is localized at the speaker position. The amplifier 208 amplifies and supplies a 2-channel or multi-channel output linear PCM signal obtained by the audio mixer 207 to the speaker system 250.

It is to be noted that it is also possible that, for example, to configuration information indicative of a configuration of a linear PCM signal, information that speaker position information set in advance is to be applied is added. In this case, speaker position information set in advance can be used.

The system controller 205 controls reproduction of a compressed audio signal and/or a linear PCM signal on the basis of reproduction control information sent thereto from the SPDIF reception circuit 204.

For example, in a case where this reproduction control information is information for controlling reproduction level adjustment of a compressed audio signal, the system controller 205 controls the audio mixer 207 to adjust the reproduction level of a linear PCM signal obtained by decoding the compressed audio signal.

In this case, for example, if the reproduction level of the compressed audio signal is adjusted to a low level, then reproduction sound of a linear PCM signal from the interphone 125, a linear PCM signal of operation sound of the remote controller 126, a linear PCM signal of mail reception notification sound, and so forth becomes outstanding, by which the reproduction sound can be noticed by the user.

It is to be noted that, in a case where the reproduction level of the compressed audio signal is adjusted to a low level, the sound image according to the linear PCM signal may be controlled together with this adjustment such as to be localized at a position in the proximity of the user. In this case, the linear PCM signal acquired by the SPDIF reception circuit 204 is processed by the digital signal processor 211 under the control of the system controller 205 such that the sound image according to the linear PCM signal is localized at a position in the proximity of the user. In such a manner, it is also possible to control the sound image according to the linear PCM signal such as to be localized at a position in the proximity of the user is performed in a state in which the reproduction level of the compressed audio signal is not adjusted to a low level.

Further, in a case where the reproduction level of the compressed audio signal is adjusted to a low level, together with this adjustment, such control as to use an at-hand speaker of the user as a reproduction speaker for the linear PCM signal may be performed. In this case, the linear PCM signal acquired by the SPDIF reception circuit 204 is sent to the at-hand speaker system 251 under the control of the system controller 205. In such a manner, it is also possible to control such that the at-hand speaker of the user is used as a reproduction speaker for the linear PCM signal is performed in a state in which the reproduction level of the compressed audio signal is not adjusted to a low level.

Further, for example, in a case where this reproduction control information is information for performing control to replace the center channel of the compressed audio signal with the linear PCM signal, the system controller 205 controls the audio mixer 207 such that the audio signal of the center channel is replaced with the linear PCM signal. Consequently, it is possible to allow reproduction sound of the linear PCM signal to be heard clearly without being disturbed by reproduction sound of the audio signal of the center channel.

Further, for example, in a case where the reproduction control information is information for performing control to lower the reproduction level of the compressed audio signal in response to a predetermined operation by the user, the system controller 205 controls the audio mixer 207 to lower the reproduction level of the compressed audio signal. Consequently, it is possible to temporarily avoid that reproduction sound of the compressed audio signal bothers the user.

The display section 209 displays a state of the audio amplifier 200 and so forth. In the present embodiment, the display section 209 performs display relating to reproduction control information similarly to the display 113 of the television receiver 100 described hereinabove (refer to FIGS. 3A, 3B, 3C and 3D). This display signal is supplied from the system controller 205.

"Example of Configuration of HDMI Transmission Section/Reception Section"

Figure 4:
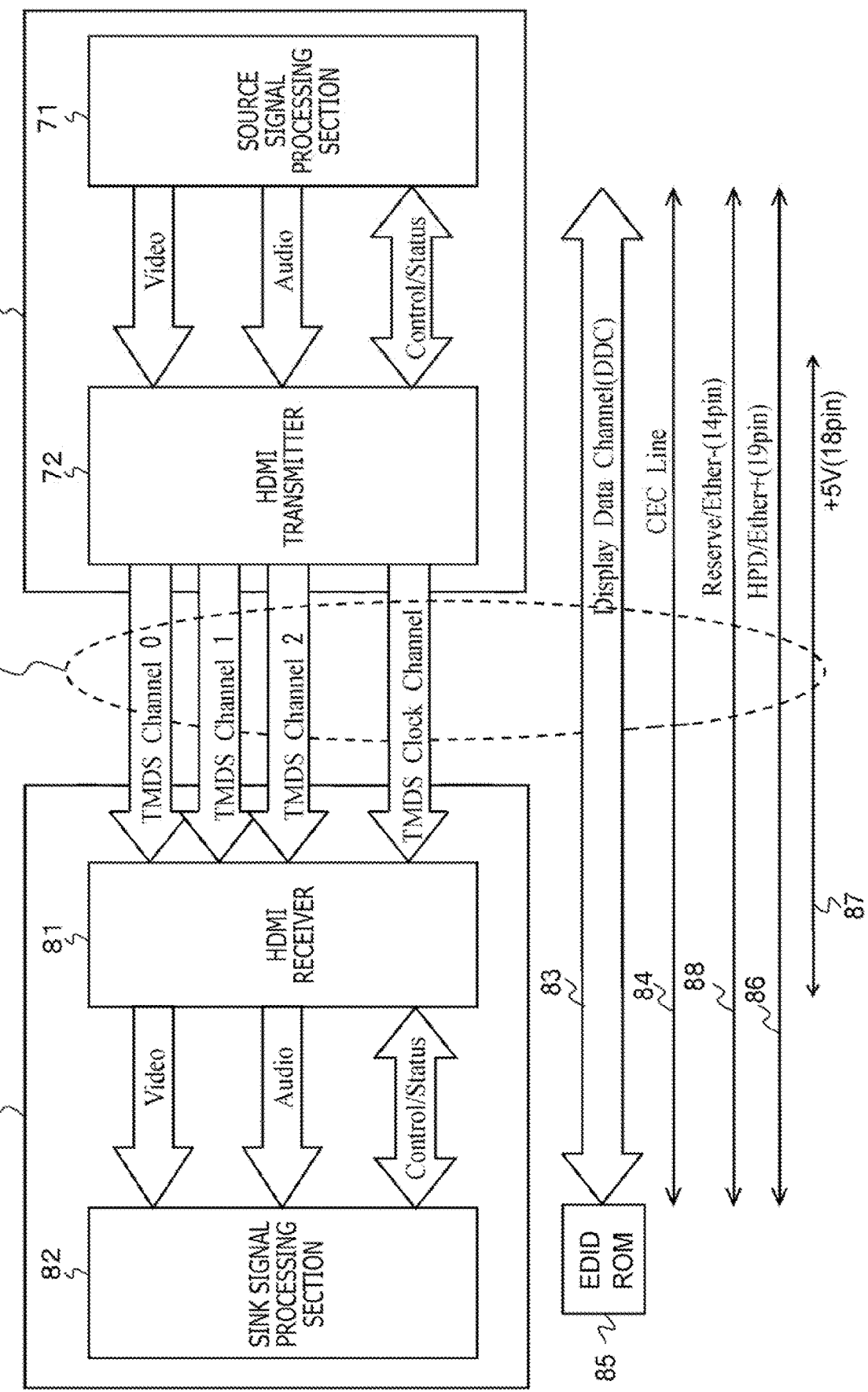
FIG. 4 is a block diagram depicting an example of a configuration of an HDMI reception section of the television receiver and an HDMI transmission section of the audio amplifier.

FIG. 4 depicts an example of a configuration of the HDMI reception section 102 of the television receiver 100 and the HDMI transmission section 202 of the audio amplifier 200 in the AV system 10 of FIG. 1.

The HDMI transmission section 202 transmits, in plural channels, a differential signal of image data for one screen image of the baseband (non-compressed) one-directionally to the HDMI reception section 102 during an effective image interval (hereinafter referred to as an "active video interval" as appropriate) that is an interval where a horizontal blanking period and a vertical blanking period are excluded from an interval (hereinafter referred to as a "video field" as appropriate) from a certain vertical synchronizing signal to a next vertical synchronizing signal. Further, within a horizontal blanking period and a vertical blanking period, the HDMI transmission section 202 transmits, in plural channels, a differential signal corresponding to sound data and a control packet associated with the image data and corresponding to other auxiliary data and so forth one-directionally to the HDMI reception section 102.

The HDMI transmission section 202 includes a source signal processing section 71 and an HDMI transmitter 72. To the source signal processing section 71, data of a non-compressed image (Video) and sound (Audio) of the baseband are supplied. The source signal processing section 71 performs necessary processing for the data of the image and the sound supplied thereto and supplies resulting data to the HDMI transmitter 72. Further, the source signal processing section 71 communicates controlling information, information for the notification of a status (Control/Status), and so forth with the HDMI transmitter 72 as occasion demands.

The HDMI transmitter 72 converts image data supplied thereto from the source signal processing section 71 into a corresponding differential signal and transmits the differential signal in three TMDS channels #0, #1, and #2, which are the plural channels, one-directionally to the HDMI reception section 102 connected thereto through the HDMI cable 300.

Further, the transmitter 72 converts, into corresponding differential signals, sound data and control packets associated with the non-compressed image data, other auxiliary data, and control data such as a vertical synchronizing signal (VSYNC), a horizontal synchronizing signal (HSYNC), and so forth supplied thereto from the source signal processing section 71, and transmits the converted differential signals in the three TMDS channels #0, #1, and #2 one-directionally to the HDMI reception section 102 connected thereto through the HDMI cable 300.

Further, the transmitter 72 transmits, in a TMDS clock channel, a pixel clock synchronized with the image data to be transmitted in the three TMDS channels #0, #1, and #2, to the HDMI reception section 102 connected thereto through the HDMI cable 300.

The HDMI reception section 102 receives a differential signal that is transmitted one-directionally thereto from the HDMI transmission section 202 in the plural channels during an active video interval and that corresponds to image data, and receives differential signals that are transmitted thereto from the HDMI transmission section 202 in the plural channels during a horizontal blanking period and a vertical blanking period and that correspond to auxiliary data and control data.

The HDMI reception section 102 includes an HDMI receiver 81 and a sink signal processing section 82. The HDMI receiver 81 receives a differential signal corresponding to image data and differential signals corresponding to auxiliary data and control data, the differential signals being transmitted one-directionally thereto from the HDMI transmission section 202 connected thereto through the HDMI cable 300, in the TMDS channels #0, #1 and #2 in synchronism with a pixel clock transmitted thereto in the TMDS clock channel similarly from the HDMI transmission section 202. Further, the HDMI receiver 81 converts the differential signals into corresponding image data, auxiliary data, and control data and supplies the data to the sink signal processing section 82 as occasion demands.

The sink signal processing section 82 performs necessary processing for data supplied thereto from the HDMI receiver 81 and outputs resulting data. Further, the sink signal processing section 82 communicates controlling information, information (Control/Status) for the notification of a status, and so forth with the HDMI receiver 81 as occasion demands.

Transmission channels of the HDMI include a DDC (Display Data Channel) 83 and a transmission channel called CEC line 84, in addition to the three TMDS channels #0, #1, and #2 for one-directionally and serially transmitting image data, auxiliary data, and control data from the HDMI transmission section 202 to the HDMI reception section 102 in synchronism with the pixel clock, and the TMDS channel as a transmission channel for transmitting the pixel clock.

The DDC 83 includes two lines (signal lines) not depicted included in the HDMI cable 300 and is used to allow source equipment to read out E-EDID (Enhanced-Extended Display Identification) from sink equipment connected to the source equipment through the HDMI cable 300. In particular, the sink equipment includes an EDID ROM 85. The source equipment reads out, through the DDC 83, the E-EDID stored in the EDID ROM 85 from the sink equipment which is connected thereto through the HDMI cable 300, and recognizes setting and performance of the sink equipment on the basis of the E-EDID.

The CEC line 84 includes a single line, not depicted, included in the HDMI cable 300 and is used to perform bidirectional communication of controlling data between the source equipment and the sink equipment.

Further, the HDMI cable 300 includes a line 86 connected to a pin called HPD (Hot Plug Detect). The source equipment can detect connection of the sink equipment with use of the line 86. The HDMI cable 300 further includes a line 87 that is used to supply power from the source equipment to the sink equipment. Furthermore, the HDMI cable 300 includes a reserved line 88.

Figure 5:
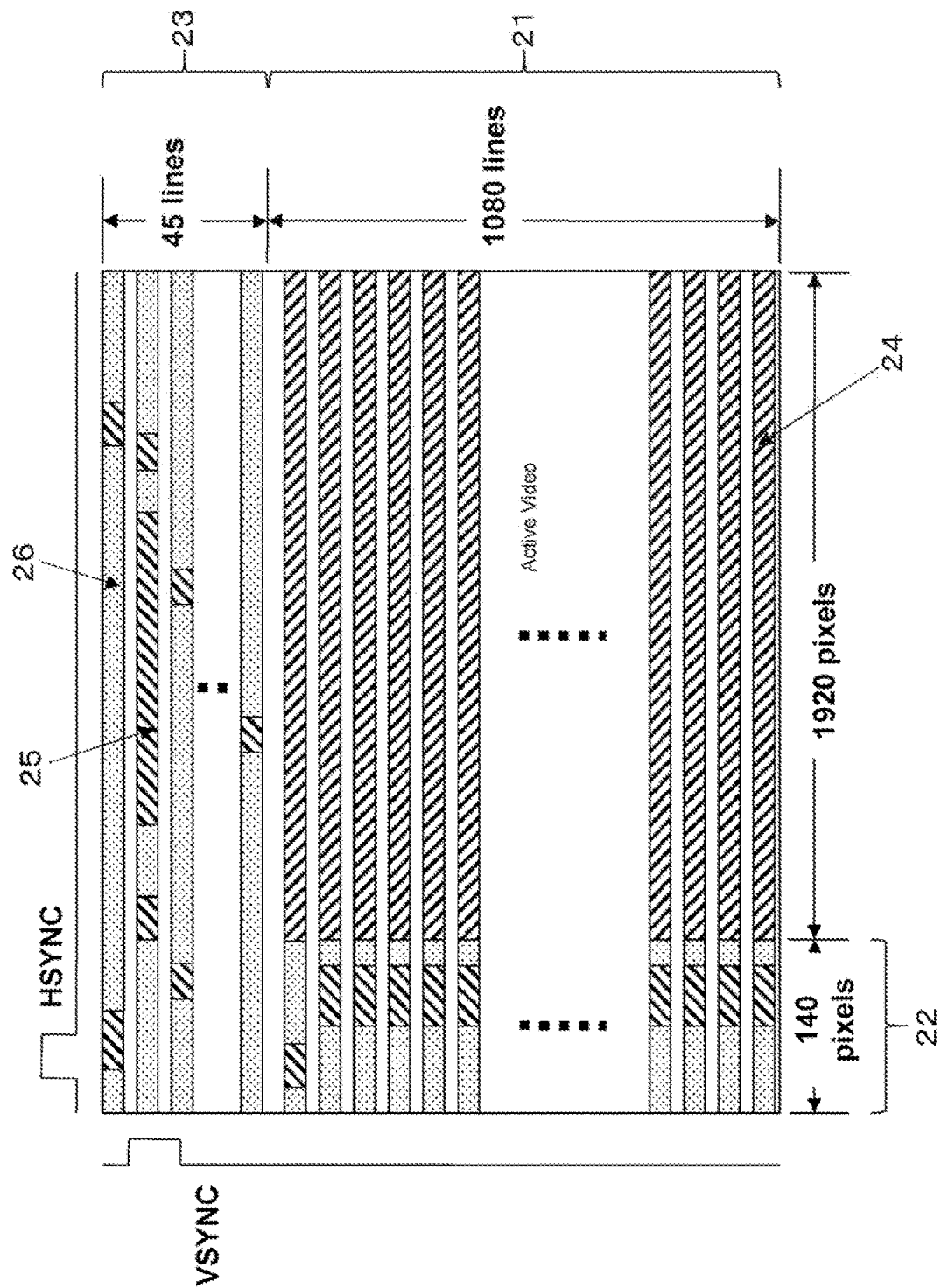
FIG. 5 is a view depicting intervals of various kinds of transmission data in a case where image data of 1920 pixels×1080 lines in length and height is transmitted in a TMDS channel.

FIG. 5 depicts intervals for various kinds of transmission data in a case where image data of 1920 pixels×1080 lines in length and width is transmitted in the TMDS channel. The video field in which transmission data is transmitted in the three TMDS channels of the HDMI includes three kinds of intervals of a video data interval 24 (Video Data Period), a data island interval 25 (Data Island Period), and a control interval 26 (Control Period) on the basis of the kinds of transmission data.

The video field interval is an interval from a rising edge (Active Edge) of a certain vertical synchronizing signal to a rising edge of a next vertical synchronizing signal and is divided into a horizontal blanking period 22 (Horizontal Blanking), a vertical blanking period 23 (Vertical Blanking), and an effective pixel interval 21 (Active Video) that is an interval where the horizontal blanking period and the vertical blanking period are excluded from the video field interval.

The video data interval 24 is allocated to the effective pixel interval 21. In the video data interval 24, data of effective pixels (Active Pixel) for 1920 pixels×1080 lines configuring image data for one non-compressed screen image is transmitted. The data island interval 25 and the control interval 26 are allocated to the horizontal blanking period 22 and the vertical blanking period 23. In the data island interval 25 and the control interval 26, auxiliary data is transmitted.

In particular, the data island interval 25 is allocated to one part of the horizontal blanking period 22 and the vertical blanking period 23. In the data island interval 25, among pieces of the auxiliary data, data that does not relate to control, for example, a packet of sound data and so forth, are transmitted. The control interval 26 is allocated to the other part of the horizontal blanking period 22 and the vertical blanking period 23. In the control interval 26, among pieces of the auxiliary data, data relating to control, for example, a vertical synchronizing signal and a horizontal synchronizing signal, a control packet, and so forth are transmitted.

FIG. 6 depicts a pin array of the HDMI connector. This pin array is an example of a type-A. Two lines, which are differential lines along which TMDS Data #i+ and TMDS Data #i− that are a differential signal of the TMDS channel #i are transmitted, are connected to pins to which the TMDS Data #i+ is allocated (pins of the pin numbers 1, 4, and 7) and pins to which the TMDS Data #i− is allocated (pins of the pin numbers 3, 6, and 9), respectively.

Meanwhile, the CEC line 84 along which a CEC signal that is controlling data is transmitted is connected to the pin of the pin number 13, and the pin of the pin number 14 is a free (Reserved) pin. Further, a line along which an SDA (Serial Data) signal such as E-EDID or the like is connected to the pin of the pin number 16, and a line along which an SCL (Serial Clock) signal that is a clock signal used for synchronization upon transmission and reception of an SDA signal is transmitted is connected to the pin of the pin number 15. The DDC 83 described above includes the line along which the SDA signal is transmitted and the line along which the SCL signal is transmitted.

Further, the HPD line 86 for allowing source equipment to detect connection of sink equipment as described above is connected to the pin of the pin number 19. Further, the power supply line 87 for supplying power as described above is connected to the pin of the pin number 18.

"Example of Configuration of High Speed Bus Interface"

Figure 7:
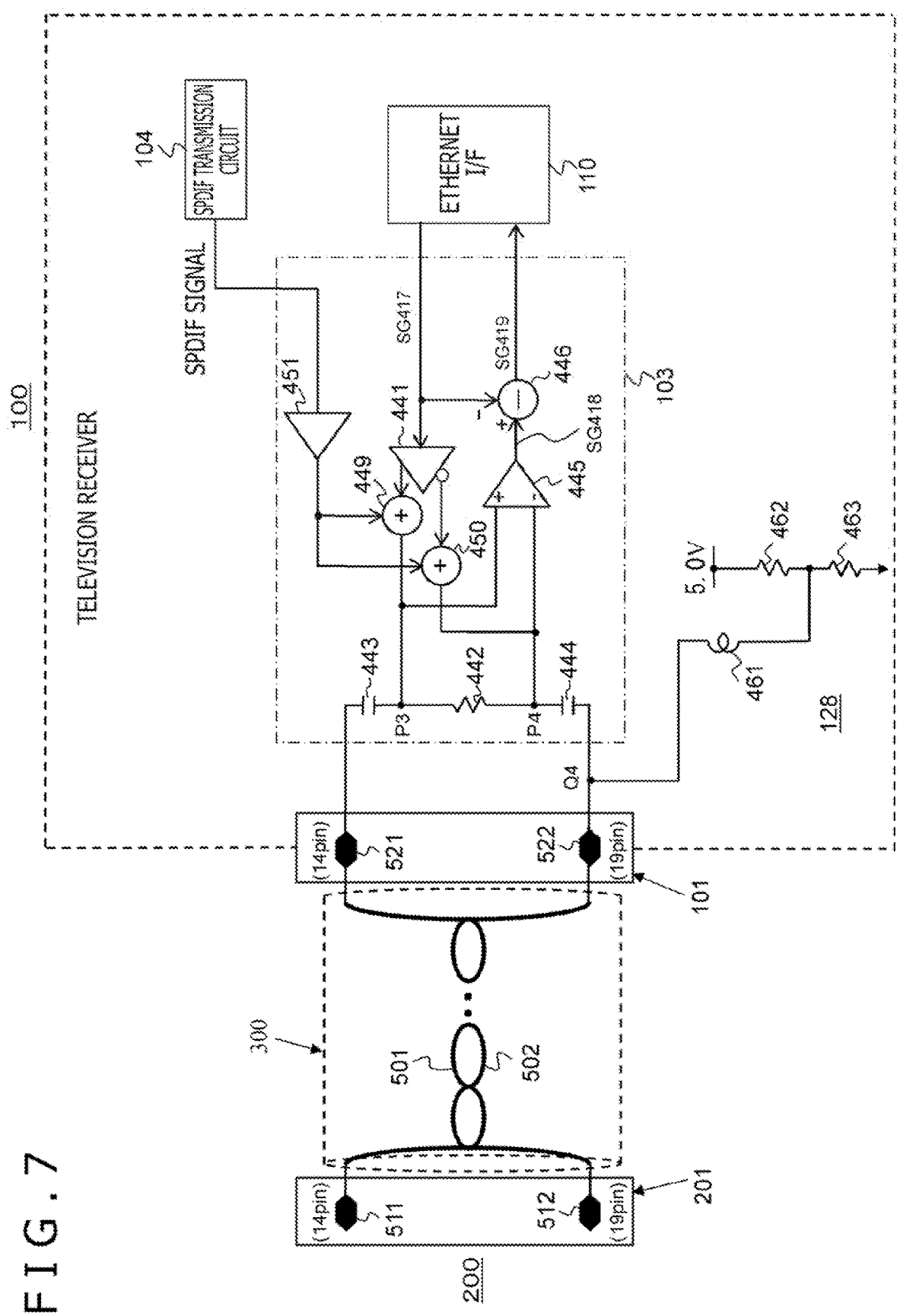
FIG. 7 is a view depicting an example of a configuration of a high speed bus interface of the television receiver.

FIG. 7 depicts an example of a configuration of the high speed bus interface 103 of the television receiver 100 in the AV system 10 of FIG. 1. The Ethernet interface 110 performs LAN (Local Area Network) communication, that is, transmission and reception of an Ethernet signal, with use of a transmission line including a pair of lines of the reserved line and the HPD line from among the plural lines configuring the HDMI cable 300. The SPDIF transmission circuit 104 transmits an SPDIF signal with use of the transmission line including the pair of lines described above.

The television receiver 100 includes a LAN signal transmission circuit 441, a termination resistor 442, AC coupling capacitors 443 and 444, a LAN signal reception circuit 445, a subtraction circuit 446, addition circuits 449 and 450, and an amplifier 451. The components mentioned configure the high speed bus interface 103. The television receiver 100 further includes a choke coil 461, a resistor 462, and another resistor 463 that configure a plug connection transmission circuit 128.

A series circuit of the AC coupling capacitor 443, the termination resistor 442, and the AC coupling capacitor 444 is connected between a 14-pin terminal 521 and a 19-pin terminal 522 of the HDMI terminal 101. Further, a series circuit of the resistor 462 and the resistor 463 is connected between a power supply line (+5.0 V) and a ground line. Further, a junction between the resistor 462 and the resistor 463 is connected to a junction Q4 between the 19-pin terminal 522 and the AC coupling capacitor 444 through the choke coil 461.

A junction P3 between the AC coupling capacitor 443 and the termination resistor 442 is connected to the output side of the addition circuit 449 and also to the positive input side of the LAN signal reception circuit 445. Further, a junction P4 between the AC coupling capacitor 444 and the termination resistor 442 is connected to the output side of the addition circuit 450 and also to the negative input side of the LAN signal reception circuit 445.

The addition circuit 449 is connected at one of the input sides thereof to the positive output side of the LAN signal transmission circuit 441, and to the other input side thereof, an SPDIF signal outputted from the SPDIF transmission circuit 104 is supplied through the amplifier 451. Further, the addition circuit 450 is connected at one of the input sides thereof to the negative output side of the LAN signal transmission circuit 441, and to the other input side thereof, the SPDIF signal outputted from the SPDIF transmission circuit 104 is supplied through the amplifier 451.

To the input side of the LAN signal transmission circuit 441, a transmission signal (transmission data) SG417 is supplied from the Ethernet interface 110. Further, to the positive side terminal of the subtraction circuit 446, an output signal SG418 of the LAN signal reception circuit 445 is supplied while, to the negative side terminal of the subtraction circuit 446, the transmission signal SG417 is supplied. The subtraction circuit 446 subtracts the transmission signal SG417 from the output signal SG418 of the LAN signal reception circuit 445 to obtain a reception signal (reception data) SG419. In a case where a LAN signal (Ethernet signal) is transmitted as a differential signal through the reserved line and the HPD line, the reception signal SG419 is the LAN signal. The reception signal SG419 is supplied to the Ethernet interface 110.

Figure 8:
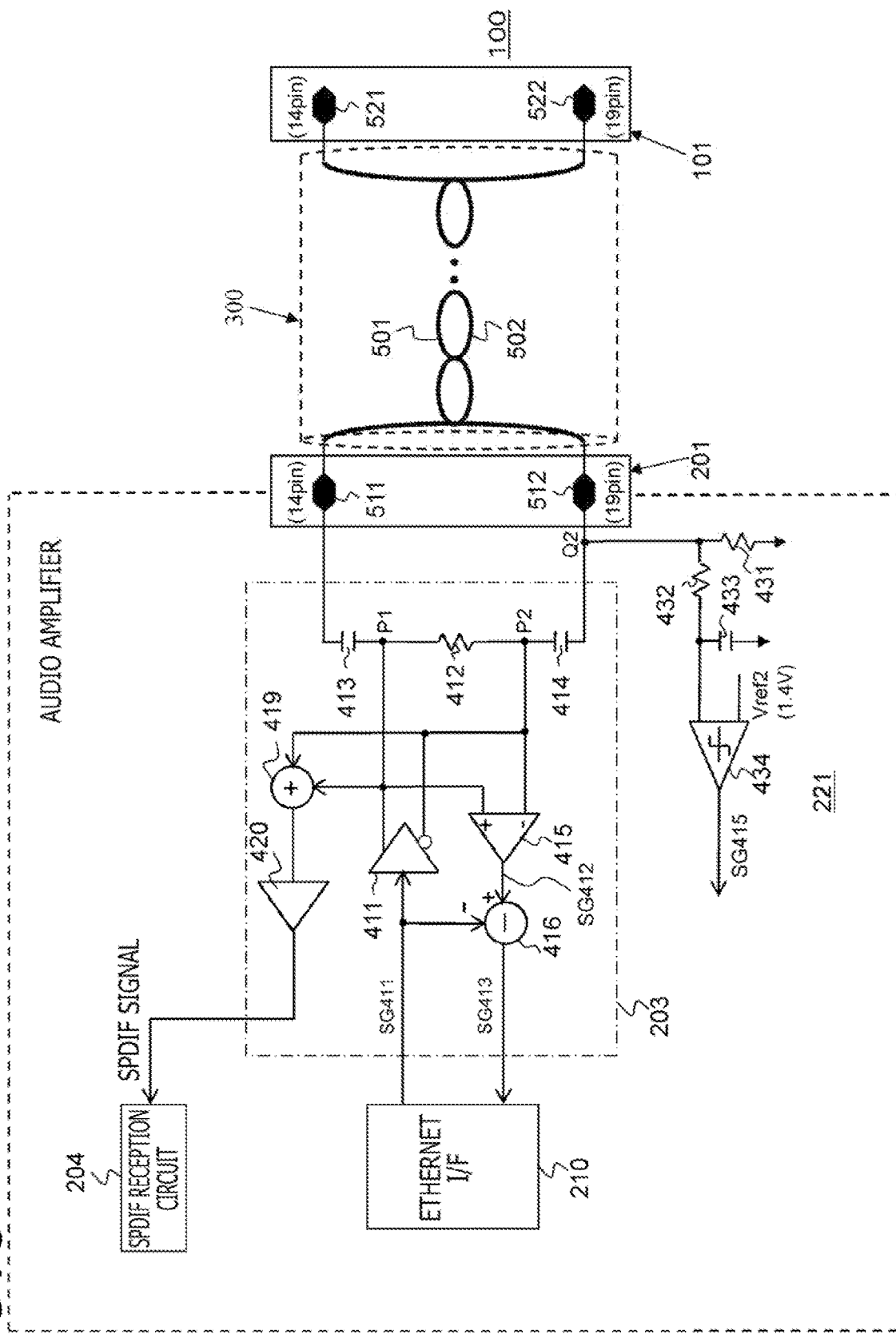
FIG. 8 is a view depicting an example of a configuration of a high speed bus interface of the audio amplifier.

FIG. 8 depicts an example of a configuration of the high speed bus interface 203 of the audio amplifier 200 in the AV system 10 of FIG. 1. The Ethernet interface 210 performs LAN (Local Area Network) communication, that is, transmission and reception of an Ethernet signal, with use of a transmission line including the pair of lines of the reserved line and the HPD line from among the plural lines configuring an HDMI cable 610. The SPDIF reception circuit 204 receives an SPDIF signal with use of the transmission line including the pair of lines described above.

The audio amplifier 200 includes a LAN signal transmission circuit 411, a termination resistor 412, AC coupling capacitors 413 and 414, a LAN signal reception circuit 415, a subtraction circuit 416, an addition circuit 419, and an amplifier 420. The components mentioned configure the high speed bus interface 203. The audio amplifier 200 further includes a pull-down resistor 431, a resistor 432, a capacitor 433, and a comparator 434 that configure a plug connection detection circuit 221. Here, the resistor 432 and the capacitor 433 configure a low-pass filter.

A series circuit of the AC coupling capacitor 413, the termination resistor 412, and the AC coupling capacitor 414 is connected between a 14-pin terminal 511 and a 19-pin terminal 512 of the HDMI terminal 201. A junction P1 between the AC coupling capacitor 413 and the termination resistor 412 is connected to the positive output side of the LAN signal transmission circuit 411 and also to the positive input side of the LAN signal reception circuit 415.

A junction P2 between the AC coupling capacitor 414 and the termination resistor 412 is connected to the negative output side of the LAN signal transmission circuit 411 and also to the negative input side of the LAN signal reception circuit 415. To the input side of the LAN signal transmission circuit 411, a transmission signal (transmission data) SG411 is supplied from the Ethernet interface 210.

To the positive side terminal of the subtraction circuit 416, an output signal SG412 of the LAN signal reception circuit 415 is supplied, and to the negative side terminal of the subtraction circuit 416, a transmission signal (transmission data) SG411 is supplied. The subtraction circuit 416 subtracts the transmission signal SG411 from the output signal SG412 of the LAN signal reception circuit 415 to obtain a reception signal SG413. In a case where a LAN signal (Ethernet signal) is transmitted as a differential signal through the reserved line and the HPD line, the reception signal SG413 is the LAN signal. The reception signal SG413 is supplied to the Ethernet interface 210.

A junction Q2 between the AC coupling capacitor 414 and the 19-pin terminal 512 is connected to the ground line through the pull-down resistor 431 and connected to the ground line through the series circuit of the resistor 432 and the capacitor 433. Thus, an output signal of the low-pass filter obtained at a junction between the resistor 432 and the capacitor 433 is supplied to one of the input terminals of the comparator 434. The comparator 434 compares the output signal of the low-pass filter with a reference voltage Vref2 (+1.4 V) supplied to the other input terminal thereof. An output signal SG415 of the comparator 434 is supplied to a control section (CPU), not depicted, of the audio amplifier 200.

Further, the junction P1 between the AC coupling capacitor 413 and the termination resistor 412 is connected to one of the input terminals of the addition circuit 419. Meanwhile, the junction P2 between the AC coupling capacitor 414 and the termination resistor 412 is connected to the other input terminal of the addition circuit 419. An output signal of the addition circuit 419 is supplied to the SPDIF reception circuit 204 through the amplifier 420. In a case where an SPDIF signal is transmitted thereto as a same phase signal through the reserved line and the HPD line, the output signal of the addition circuit 419 is the SPDIF signal.

"Details of SPDIF Signal"

Figure 9:
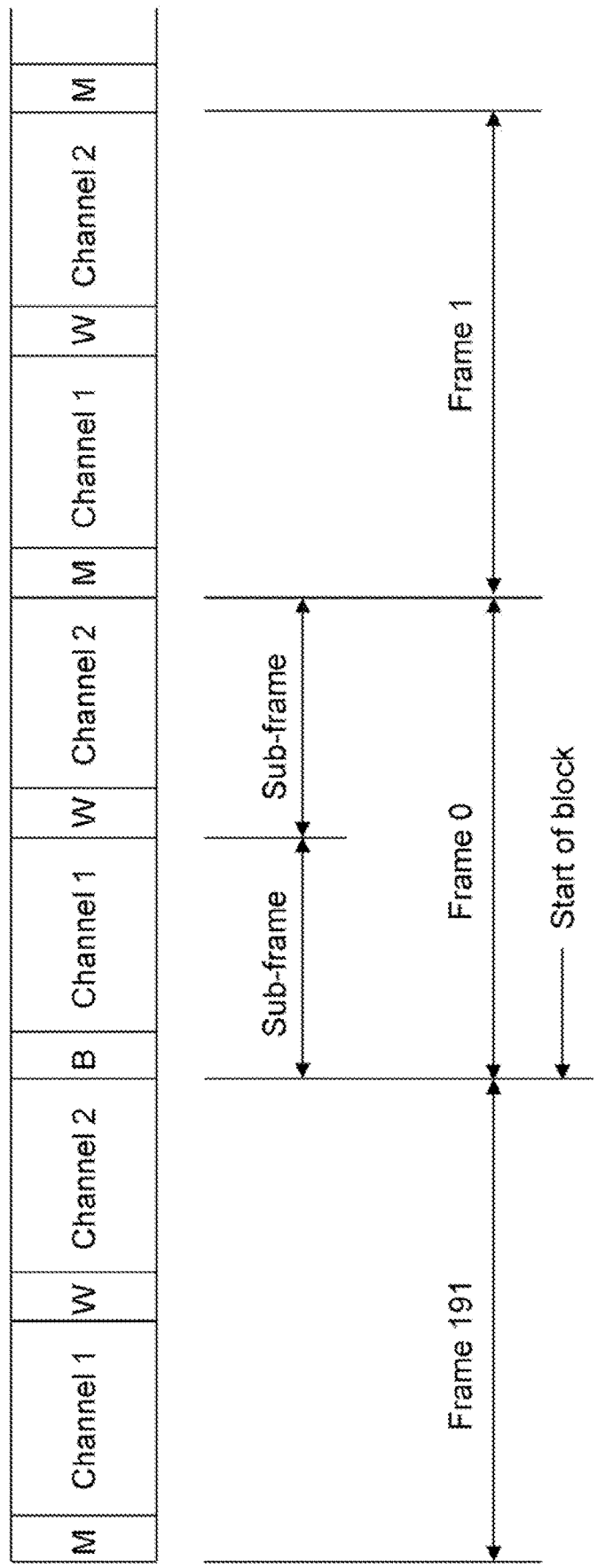
FIG. 9 is a view depicting a frame configuration according to the IEC 60958 standard.

First, an overview of the IEC 60958 standard is described. FIG. 9 depicts a frame configuration according to the IEC 60958 standard. Each frame includes two subframes. In the case of stereo 2-channel sound, a left channel signal is included in the first subframe and a right channel signal is included in the second subframe.

At the top of each subframe, a preamble is provided as hereinafter described, and "M" is given as the preamble to the left channel signal and "W" is given as the preamble to the right channel signal. However, to the preamble at the top of each 192 frames, "B" representative of the start of a block is given. In other words, one block includes 192 frames. The block is a unit configuring a channel status hereinafter described.

Figure 10:
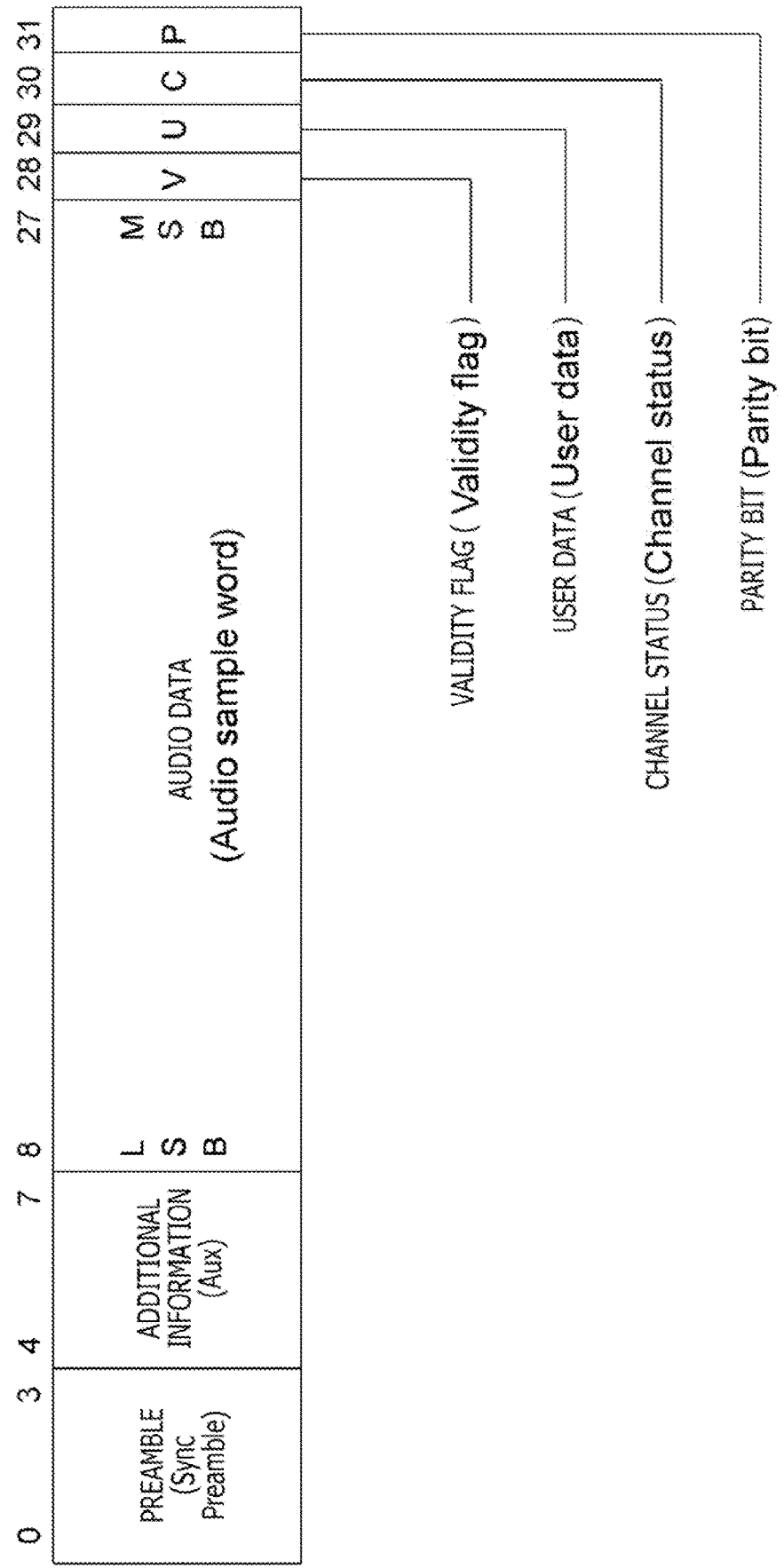
FIG. 10 is a view depicting a subframe configuration according to the IEC 60958 standard.

FIG. 10 depicts a subframe configuration according to the IEC 60958 standard. The subframe includes 32 time slots in total of the zeroth to 31st time slots. The zeroth to third time slots indicate the preamble (Sync preamble). This preamble indicates any one of "M," "W," or "B" in order to represent distinction between the left and right channels or the start of the block as described hereinabove.

The fourth to 27th time slots form a main data field and represent as a whole, in a case where a 24-bit code range is adopted, audio data. On the other hand, in a case where a 20-bit code range is adopted, the eighth to 27th time slots represent audio data (Audio sample word). In the latter case, the fourth to seventh time slots can be used as additional information (Auxiliary sample bits). The example depicted in FIG. 10 indicates the latter case.

The 28th time slot is a validity flag of the main data field. The 29th time slot represents one bit of user data. By accumulating the 29th time slot across different frames, a series of user data can be configured. A message of the user data is configured using an information unit (IU) of eight bits as a unit, and one message includes three to 129 information units.

Among information units, "0" of zero to eight bits can exist. The top of the information unit is identified with the start bit "1." The first seven information units in the message are reserved, and to the eighth and following information units, the user can set any information. The messages are separated by "0" of eight bits or more.

The 30th time slot represents one bit of a channel status. By accumulating the 30th time slot across frames for each block, a series of channel status can be configured. It is to be noted that the top position of a block is indicated by the preamble of "B" (zeroth to third time slots) as described above.

The 31st time slots is a parity bit. The parity bit is provided such that the numbers of "0" and "1" included in the fourth to 31st time slots are even numbers.

Figure 11:
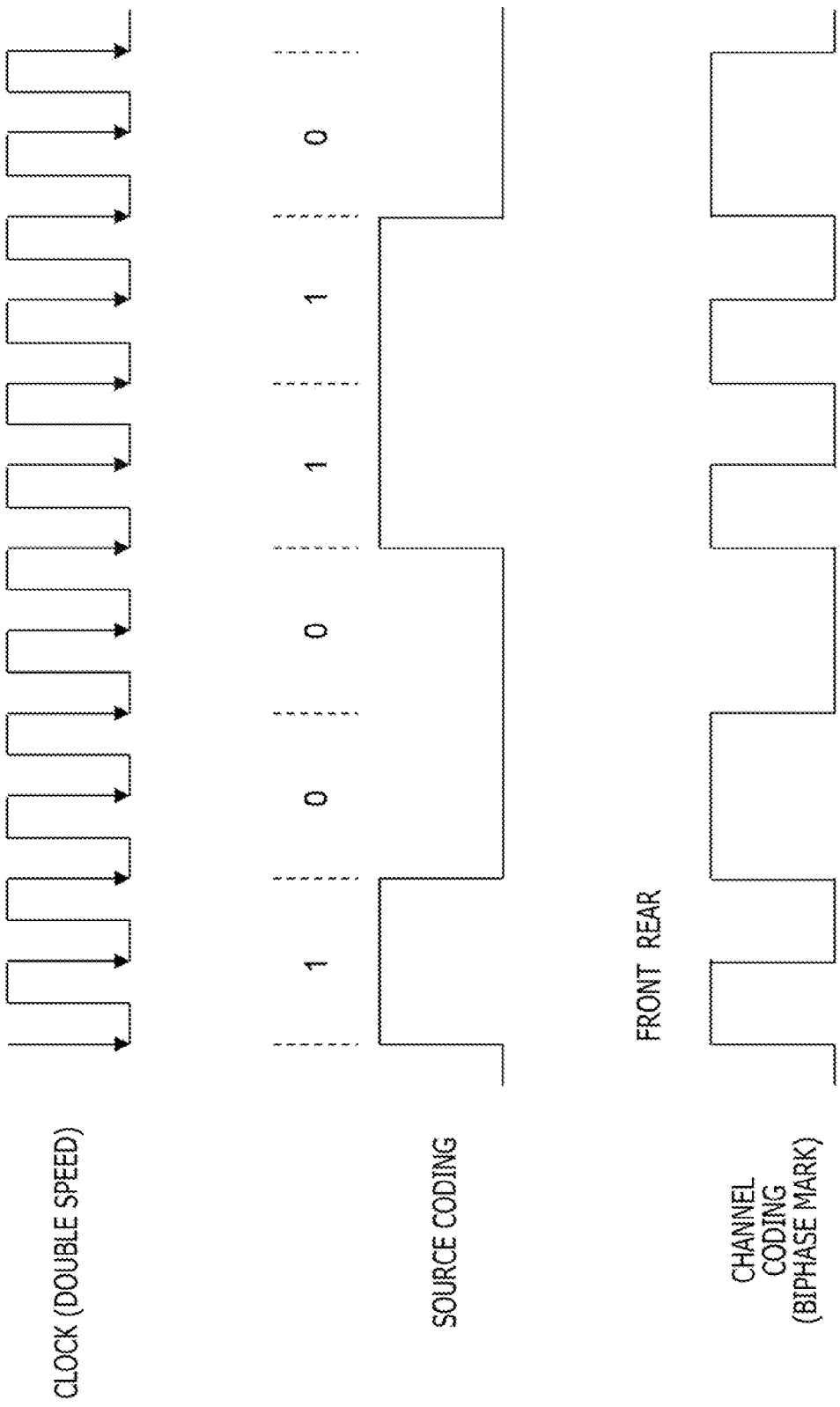
FIG. 11 is a view depicting a signal modulation method in the IEC 60958 standard.

FIG. 11 depicts a signal modulation method in the IEC 60958 standard. The fourth to 31st time slots except the preamble in the subframe are modulated by biphase mark modulation. Upon such biphase mark modulation, a clock of a rate twice that of the original signal (source coding) is used. If the clock cycle of the original signal is divided into a front half and a rear half, then the output of the biphase mark modulation is reversed at the edge of the front half of the clock cycle without fail. Further, at the edge of the rear half of the clock cycle, the output of the biphase mark modulation is reversed when the original signal indicates "1" but is not reversed when the original signal indicates "0." Consequently, a clock component of the original signal can be extracted from the signal modulated by biphase mark modulation.

FIG. 12 depicts channel coding of the preamble in the IEC 60958 standard. As described hereinabove, the fourth to 31st time slots of the subframe are biphase mark modulated. On the other hand, the preamble of the zeroth to third time slots is not subject to ordinary biphase mark modulation but is treated as a bit pattern synchronized with a clock of a double speed. In particular, by allocating two bits to each time slot from the zeroth to third time slots, such an 8-bit pattern as depicted in FIG. 12 is obtained.

If the last state is "0," then "11101000" is allocated to the preamble "B," "11100010" is allocated to "M," and "1100100" is allocated to "W." On the other hand, if the last state is "1," then "00010111" is allocated to the preamble "B," "00011101" is allocated to "M," and "00011011" is allocated to "W."

Figures 13A, 13B, 13C:
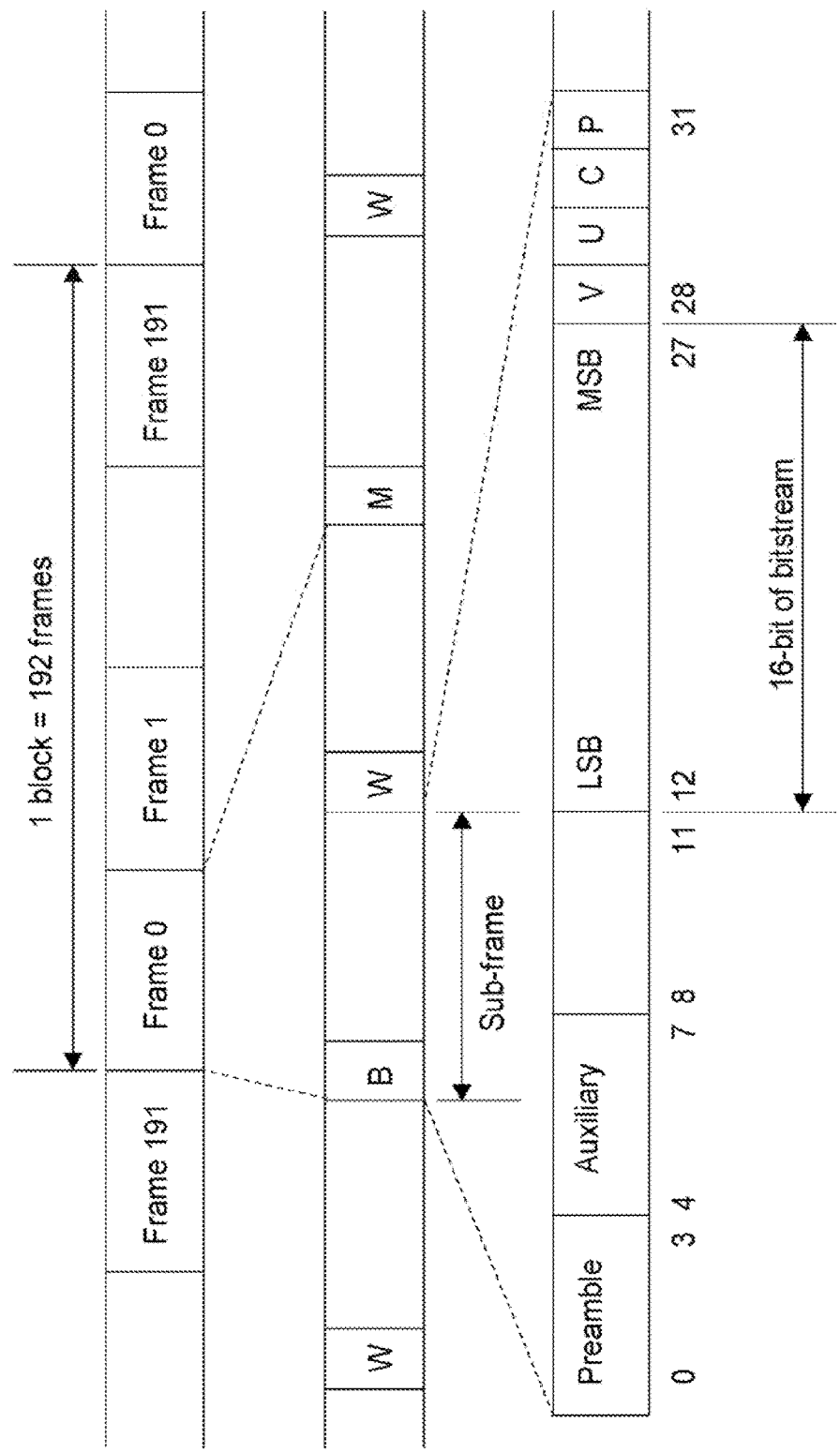
FIGS. 13A, 13B and 13C are view depicting an IEC 61937-1 interface format.

A format for transmission of a compressed audio signal on the protocol of the IEC 60958 standard is prescribed in the IEC 61937-1 standard. FIGS. 13A, 13B and 13C depicts the IEC 61937-1 interface format. FIG. 13A depicts a frame configuration. The frame configuration is such that one block includes 192 frames and such blocks are arranged successively. FIG. 13B indicates that each frame includes two subframes.

A preamble is provided at the top of the subframe, and to the preamble of the subframe at the top of the block, "B" representative of the start of the block is given. Further, to the preambles at the top of the following subframes, "W" and "M" are given alternately.

FIG. 13C depicts a subframe configuration. In the case of an SPDIF signal that includes a predetermined number of channels of compressed audio signals, a bit stream of a compressed audio signal is divided and sequentially inserted into the 12th to 27th time slots of each subframe. In other words, the upper 16 bits in an audio data region of the 24 bits of the fourth to 27th time slots of each subframe are used for transmission of a compressed audio signal.

"Simultaneous Transmission of Compressed Audio Signal and Linear PCM Signal"

In the present embodiment, a compressed audio signal and a linear PCM signal are transmitted simultaneously. As described hereinabove, as a method of transmitting a compressed audio signal and a linear PCM signal simultaneously, a first method, a second method, and a third method are available.

"First Method"

Now, details of the first method are described. In this case, an audio signal of subframe units is a mixture signal of a compressed audio signal and a linear PCM signal.

FIGS. 14A, 14B and 14C depicts an interface format in a case where a compressed audio signal and a linear PCM signal are transmitted simultaneously.

FIGS. 14A and 14B are the same as FIGS. 13A and 13B, respectively. FIG. 14C depicts a subframe configuration. Of the audio data region of 24 bits of the fourth to 27th time slots of each subframe, the upper 16 bits are used for transmission of a compressed audio signal, and the lower eight bits are used for transmission of a linear PCM signal.

As described hereinabove, to an audio signal to be transmitted from the SPDIF transmission circuit 104, identification information indicative of a configuration of the audio signal (the audio signal of subframe units is a mixture signal of a compressed audio signal and a linear PCM signal) and configuration information indicative of a configuration of the linear PCM signal are added. In the present embodiment, these pieces of information are added using the channel status bit.

FIG. 15 schematically depicts a format of the channel status in a case where a compressed audio signal and a linear PCM signal are transmitted simultaneously. The entire channel status includes the zeroth to 23rd bytes. a="0" of the zeroth bit indicates that this channel status is for consumer use. Meanwhile, b="1" of the first bit indicates that the channel status is for use for transmission of a compressed digital audio signal similarly to the case of the IEC 61937-1 interface format.

It is to be noted that the three bits of the third bit to the fifth bit are, in the conventional IEC 61937-1 interface format, "000," and even if they are same as those in the conventional format, operation is performed sufficiently. However, they may otherwise be different in value in order to identify the format of the channel status from that of the conventional IEC 61937-1 interface format. In the example depicted in FIG. 15, they are "100."

Although the four bits from the 49th bit to the 52nd bit are, in the conventional IEC 61937-1 interface format, "0000," a value different from this is set, and the four bits mentioned are identification information indicating that the audio signal of subframe units is a mixture signal of a compressed audio signal and a linear PCM signal. In the example depicted in FIG. 15, they are "1111." Further, when the four bits from the 49th bit to the 52nd bit indicate that the audio signal of subframe units is a mixture signal, the following eight bits from the 53rd bit to the 60th bit are valid.

These eight bits just mentioned are configuration information indicative of a configuration of the linear PCM signal. FIG. 16 depicts an example of a correspondence relation between values of "Multichannel configuration value (MCV)" of the eight bits from the 53rd bit to the 60th bit and configurations of the linear PCM signal. For example, "10000000" indicates "8-bit LPCM 2 channel," that is, indicates a configuration of eight bits and 2 channels. Further, for example, "01000000" indicates "8-bit LPCM Stereo 2 channel," that is, indicates an 8-bit stereo 2-channel configuration.

Further, for example, "00100000" indicates "16-bit LPCM 1 channel," that is, indicates a 16-bit and 1-channel configuration. Further, for example, "10100000" indicates "16-bit LPCM 2 channel," that is, indicates a 16-bit 2-channel configuration. Further, for example, "01100000" indicates "16-bit LPCM stereo 2 channel," that is, indicates a 16-bit stereo 2-channel configuration. Further, for example, "11100000" indicates "16-bit LPCM 4 channel," that is, indicates a 16-bit 4-channel configuration.

Figure 17A:
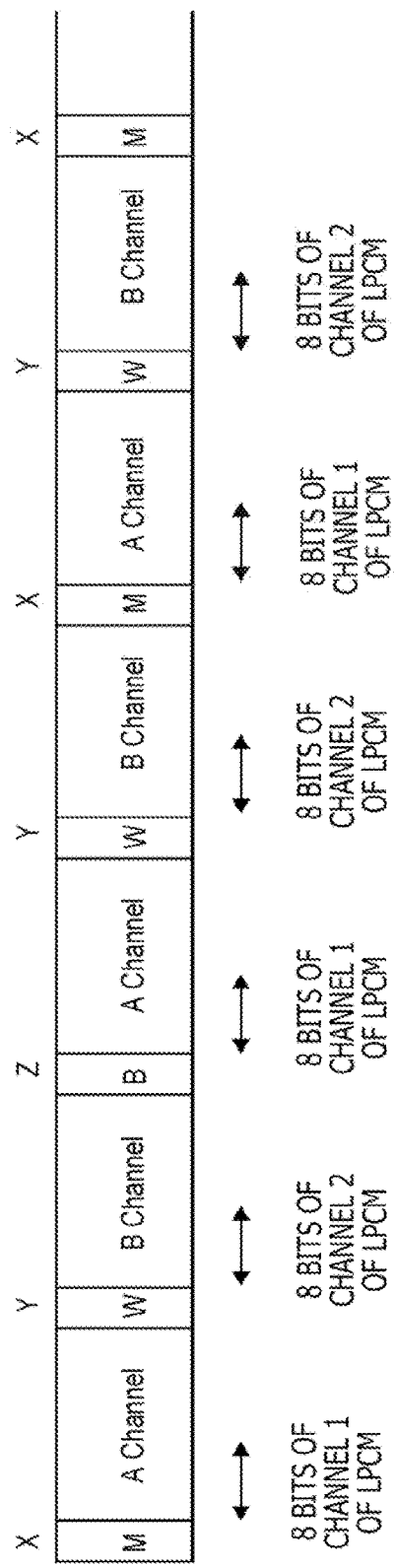
FIGS. 17A and 17B depicts views depicting examples of a frame configuration in a case of an 8-bit 2-channel configuration and a case of a 16-bit 1-channel configuration.

FIG. 17A depicts an example of a frame configuration in the case of the 8-bit 2-channel configuration. In this case, an 8-bit linear PCM signal of the channel 1 is assigned to the lower eight bits of the A channel, and an 8-bit linear PCM signal of the channel 2 is assigned to the lower eight bits of the B channel.

Figure 17B:
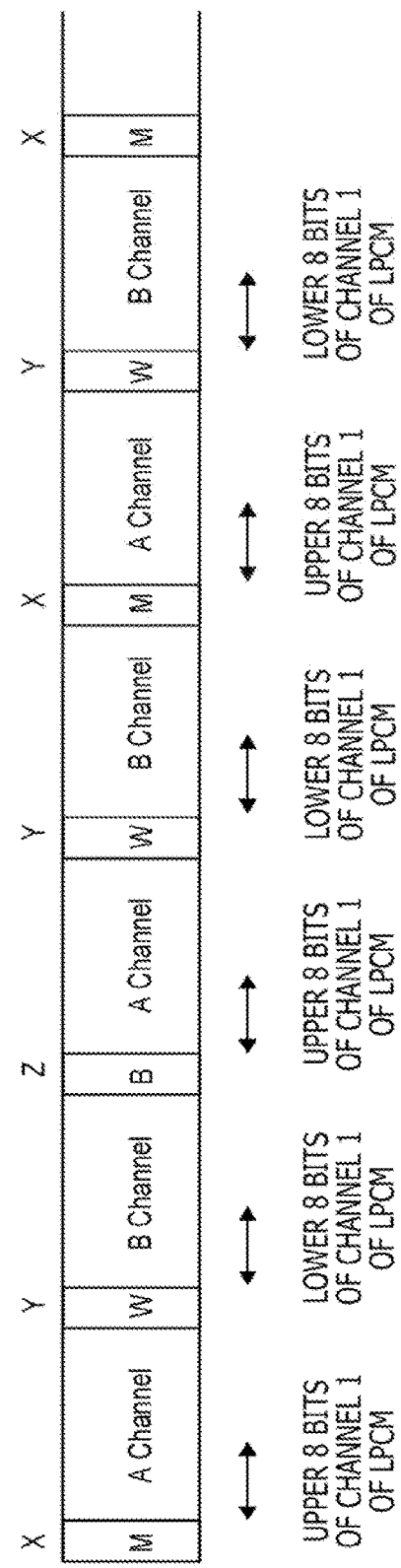

FIG. 17B depicts an example of a frame configuration in the case of the 16-bit 1-channel configuration. In this case, an upper 8-bit linear PCM signal of the channel 1 is assigned to the lower eight bits of the A channel, and a lower 8-bit linear PCM signal of the channel 1 is assigned to the lower eight bits of the B channel.

Figures 18A, 18B:
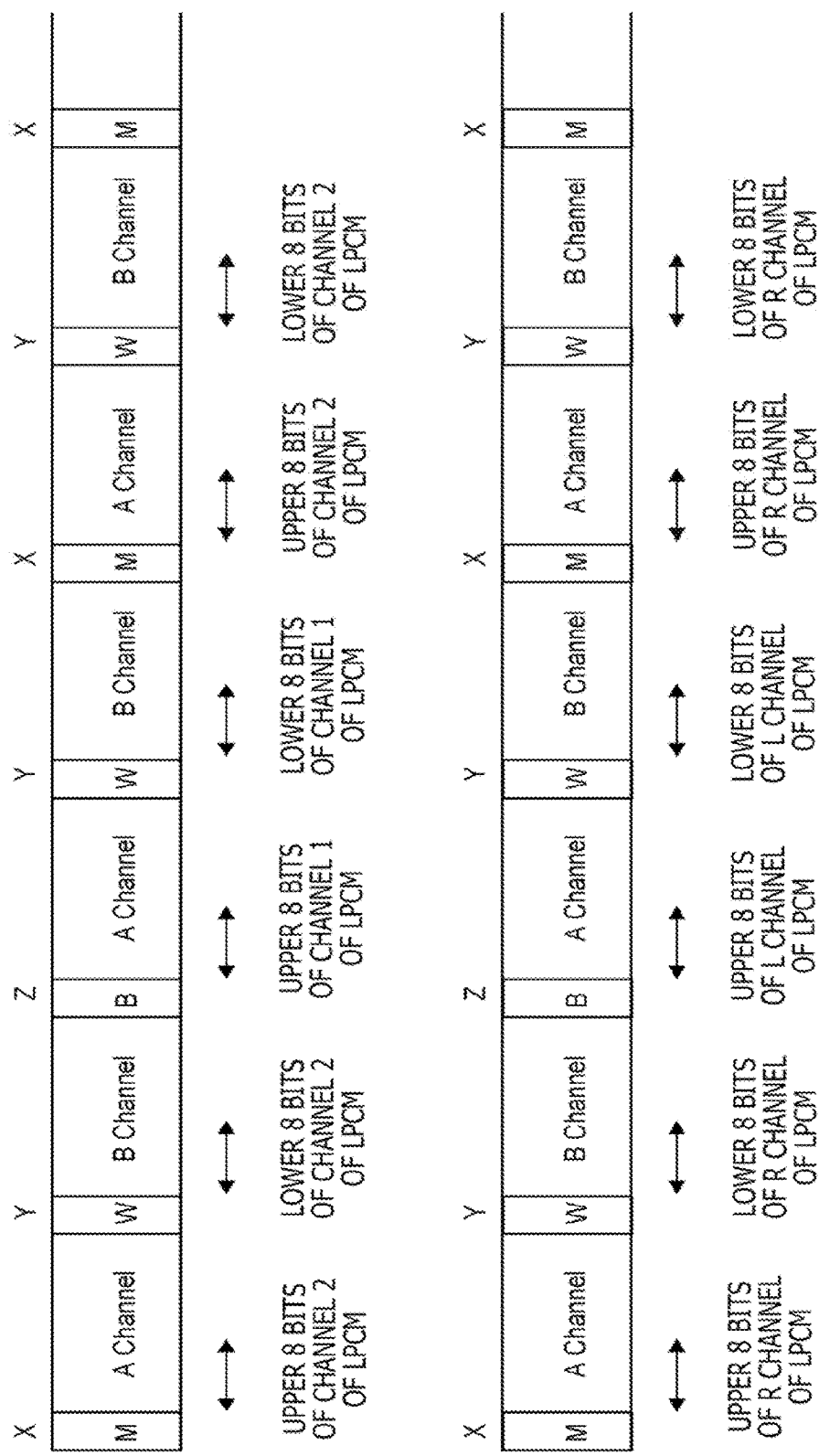
FIGS. 18A and 18B depicts views depicting examples of a frame configuration in a case of a 16-bit 2-channel configuration and a case of a 16-bit stereo 2-channel configuration.

FIG. 18A depicts an example of a frame configuration in the case of the 16-bit 2-channel configuration. In a case where the transfer rate is twice, for example, in a case where the original sampling frequency is 48 KHz and the transfer rate is 96 KHz, the sampling frequency of the linear PCM signal is not set to 96 KHz but remains 48 KHz.

In this case, as counted from the beginning of a block, an upper 8-bit linear PCM signal of the channel 1 is assigned to the lower eight bits of an odd-numbered A channel; a lower 8-bit linear PCM signal of the channel 1 is assigned to the lower eight bits of an odd-numbered B channel; an upper 8-bit linear PCM signal of the channel 2 is assigned to the lower eight bits of an even-numbered A channel; and a lower 8-bit linear PCM signal of the channel 2 is assigned to the lower eight bits of an even-numbered B channel.

FIG. 18B depicts an example of a frame configuration in the case of the 16-bit stereo 2-channel configuration. In a case where the transfer rate is twice, for example, in a case where the original sampling frequency is 48 KHz and the transfer rate is 96 KHz, the sampling frequency of the linear PCM signal is not set to 96 KHz but remains 48 KHz.

In this case, as counted from the beginning of a block, an upper 8-bit linear PCM signal of the L channel is assigned to the lower eight bits of an odd-numbered A channel; a lower 8-bit linear PCM signal of the L channel is assigned to the lower eight bits of an odd-numbered B channel; an upper 8-bit linear PCM signal of the R channel is assigned to the lower eight bits of an even-numbered A channel; and a lower 8-bit linear PCM signal of the R channel is assigned to the lower eight bits of an even-numbered B channel.

Further, though not depicted, in a frame configuration in the case of the 16-bit 4-channel configuration, the transfer rate is set to four times and a linear PCM signal of four channels is assigned. Further, though not described particularly, it is possible to increase the number of channels or set the number of bits to 32 bits, and it is also possible to transmit a linear PCM signal of 5.1 channels or the like.

FIG. 19 depicts an example of a frame configuration in a case where a stereo 2-channel linear PCM signal and a 5.1-channel linear PCM signal are transmitted. In this case, a stereo 2-channel linear PCM signal is assigned to the first one pair of the A channel and the B channel as counted from the beginning of a block, and a 5.1 channel linear PCM signal is assigned to the following three pairs of the A channel and the B channel. Thereafter, such assignments as just described are repeated.

Referring back to FIG. 15, reproduction control information is arranged in the two bits of the 61st bit and the 62nd bit. "00" indicates that there is no information. "01" indicates that the reproduction level for an audio signal obtained by decoding a compressed audio signal is to be set to −10 dB. "10" indicates that the reproduction level of the compressed audio signal is to be set to 0 dB. Further, "11" indicates that an audio signal of the center channel obtained by decoding the compressed audio signal is to be replaced with a linear PCM signal. It is to be noted that this definition of reproduction control information is an example and is not restrictive.

"Second Method"

Details of the second method are described. In this case, an audio signal in which subframe units are arranged successively is a signal in which an audio signal of subframe units including a compressed audio signal and an audio signal of subframe units including a linear PCM signal are arranged alternately.

Figures 20A, 20B:
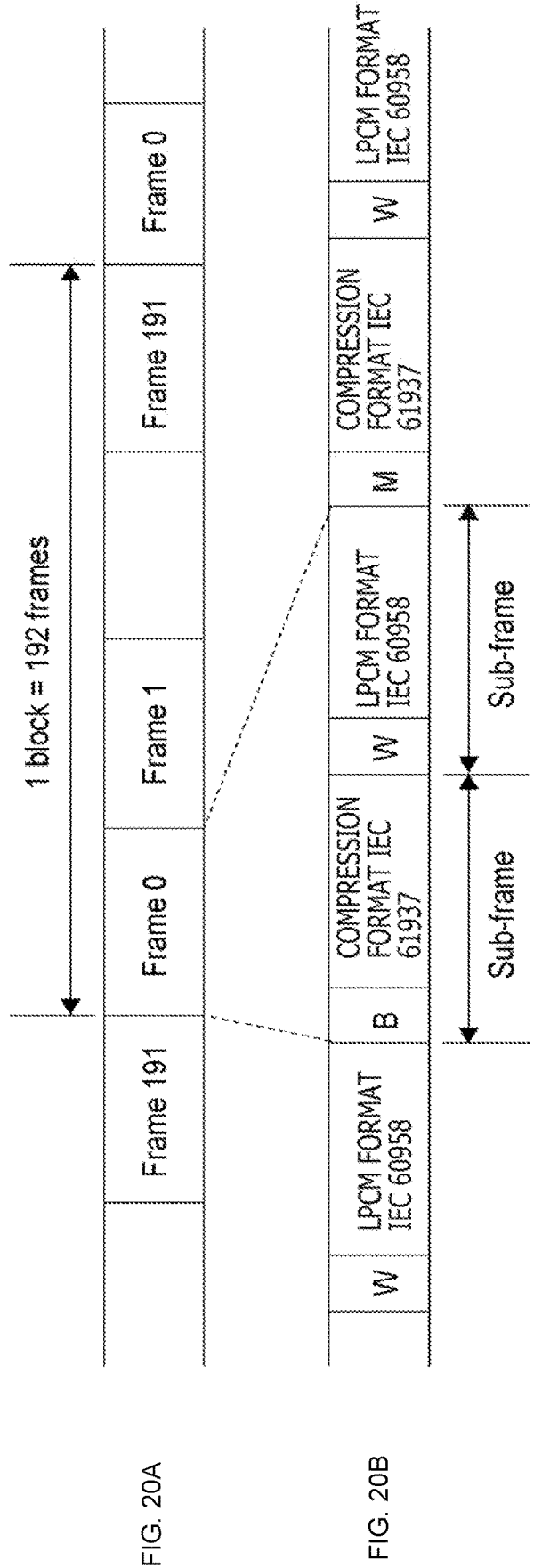
FIGS. 20A and 20B depicts views depicting an interface format (second method) in a case where a compressed audio signal and a linear PCM signal are transmitted simultaneously.

FIGS. 20A and 20B depicts an interface format in a case where the second method is adopted. FIG. 20A depicts a frame configuration. The frame configuration is such that one block includes 192 frames and such blocks are arranged successively.

FIG. 20B depicts that each frame includes two subframes. A compressed audio format based on the IEC 61937-1 standard is stored in odd-numbered subframes, and an audio signal of the linear PCM format based on the IEC 60958 standard is stored in even-numbered frames.

It is to be noted that, although an audio signal of the linear PCM format may be stored in odd-numbered frames and a compressed audio format may be stored in even-numbered subframes, the positional relation of them is determined in advance.

As described hereinabove, to an audio signal to be transmitted from the SPDIF transmission circuit 104, identification information indicative of a configuration of the audio signal (the audio signal in which subframe units are arranged successively is a signal in which an audio signal of subframe units including a compressed audio signal and an audio signal of subframe units including a linear PCM signal are arranged alternately) and configuration information indicative of a configuration of the linear PCM signal are added. In the present embodiment, these pieces of information are added using the channel status bit.

FIG. 21 schematically depicts a format of the channel status in a case where the second method is adopted. The entire channel status includes the zeroth to 23rd bytes. a="0" of the zeroth bit indicates that this channel status is for consumer use. Meanwhile, b="1" of the first bit indicates the channel status is for use for transmission of a compressed audio signal similarly to the case of the IEC 61937-1 interface format.

It is to be noted that the three bits of the third bit to the fifth bit are, in the conventional IEC 61937-1 interface format, "000," and even if they are same as those in the conventional format, operation is performed sufficiently. However, they may be different in value in order to identify the format of the channel status from that of the conventional IEC 61937-1 interface format. In the example depicted in FIG. 21, they are "100."

Although the four bits from the 49th bit to the 52nd bit are, in the conventional IEC 61937-1 interface format, "0000," a value different from this is set, and they are identification information (Subframe configuration) indicative of a configuration of the audio signal. Here, for example, "1111" is set, and this indicates that an audio signal in which subframe units are arranged successively is a signal in which an audio signal of subframe units including a compressed audio signal and an audio signal of subframe units including a linear PCM signal are arranged alternately.

Further, when the four bits from the 49th bit to the 52nd bit are "1111" as described above, the following eight bits from the 53rd bit to the 60th bit are valid. These eight bits are configuration information indicative of a configuration of the linear PCM signal.

FIG. 22 depicts an example of a correspondence relation between values of "Subframe configuration value (SCV)" of the eight bits from the 53rd bit to the 60th bit and "Configuration" which is configurations of the linear PCM signal. For example, "10000000" indicates "monaural LPCM"; "01000000" indicates "2-channel stereo LPCM"; "00100000" indicates "5.1-channel LPCM"; and "10100000" indicates "7.1-channel LPCM."

Figure 23:
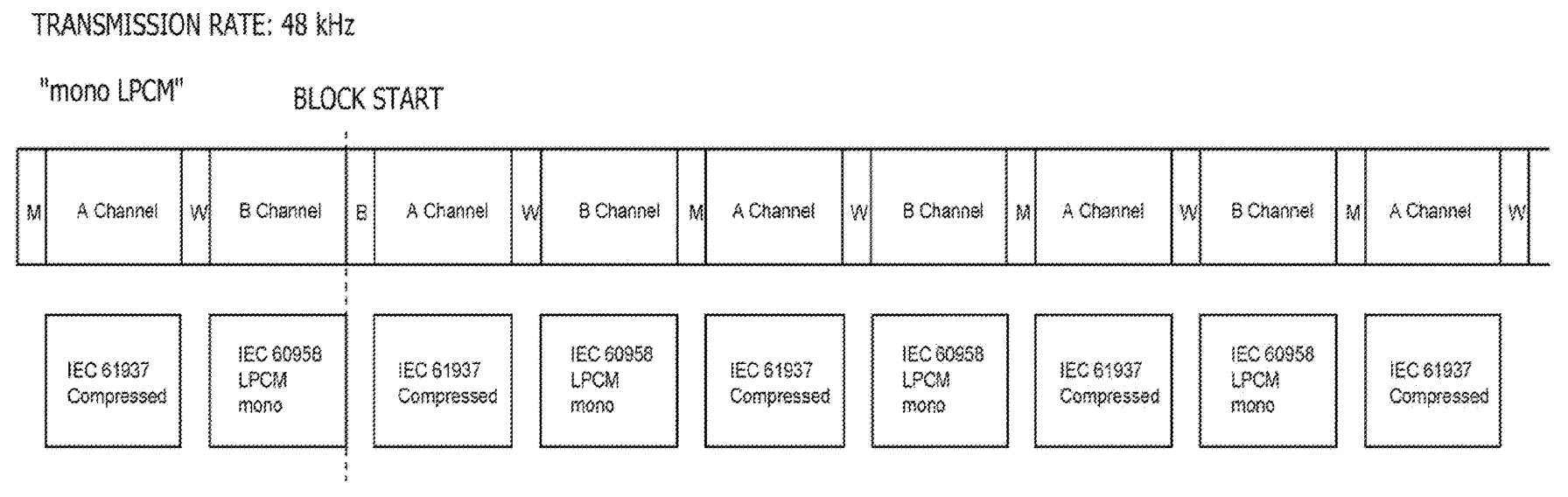

FIG. 23 depicts an example of a frame configuration in a case in which an entire stream is transmitted in 48 kHz and the configuration of the linear PCM signal is "monaural LPCM." In this case, a compressed audio signal is included in odd-numbered frames and a monaural linear PCM signal is included in even-numbered frames. It is to be noted that, in a case where the entire stream is transmitted in 48 kHz as described above, since the transmission rate of the linear PCM signal is in the maximum with the 48 kHz/1 channel configuration, even if two channels or more are designated by the SCV, the designation is invalid.

Figure 24:
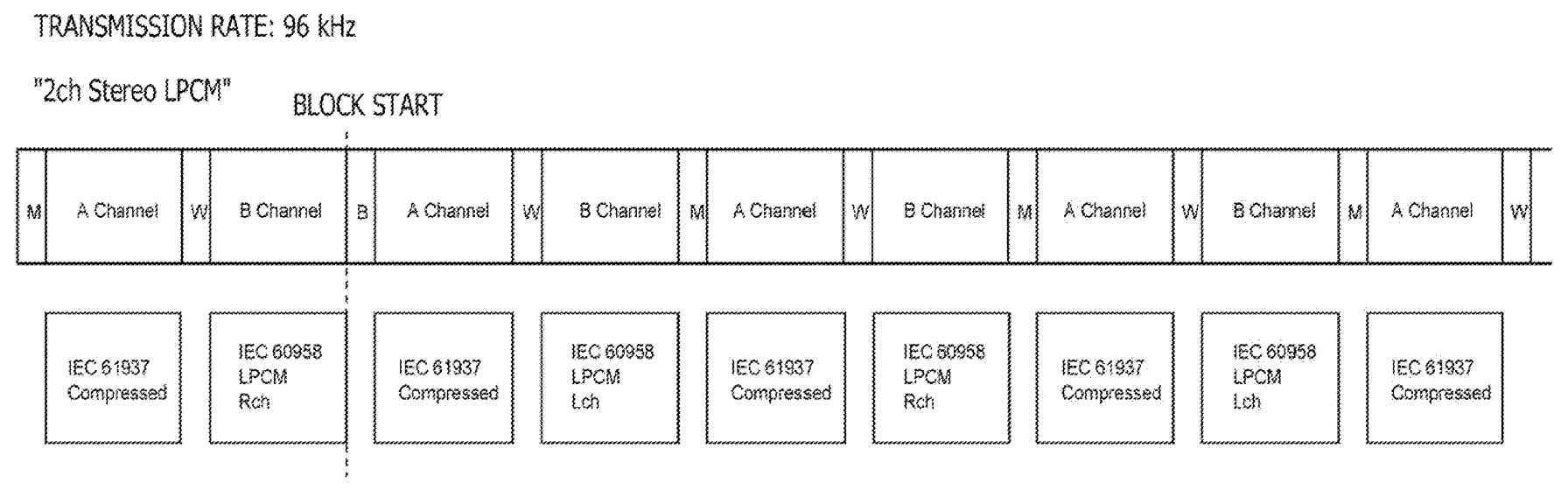

FIG. 24 depicts an example of a frame configuration in a case where the entire stream is transmitted in 96 kHz and the configuration of the linear PCM signal is "2-channel stereo LPCM." In a case where the entire stream is transmitted in 48 kHz, the transmission rate of the linear PCM signal is in the maximum with the 48 kHz/2-channel configuration. In this case, the first channel (normally the L channel) is transmitted by the W preamble next to the first B preamble in the block, and then the second channel (normally the R channel) is transmitted by the W preamble of the next M preamble. Thereafter, the first channel and the second channel are transmitted alternately.

Similarly, by increasing the transmission rate of the entire stream, transmission of "5.1-channel LPCM" and "7.1-channel LPCM" also becomes possible.

It is to be noted that it is also possible to lower the sampling frequency of the linear PCM signal part by inserting an invalid subframe. FIG. 25 depicts an example of a frame configuration in a case where the entire stream is transmitted in 96 kHz and the configuration of the linear PCM signal is "monaural LPCM." In this case, every fourth subframe is an invalid subframe. In a case where the transmission rate is 96 kHz and "monaural LPCM" is designated by the SCV, such a frame configuration as depicted in FIG. 25 is applied.

Figure 26:
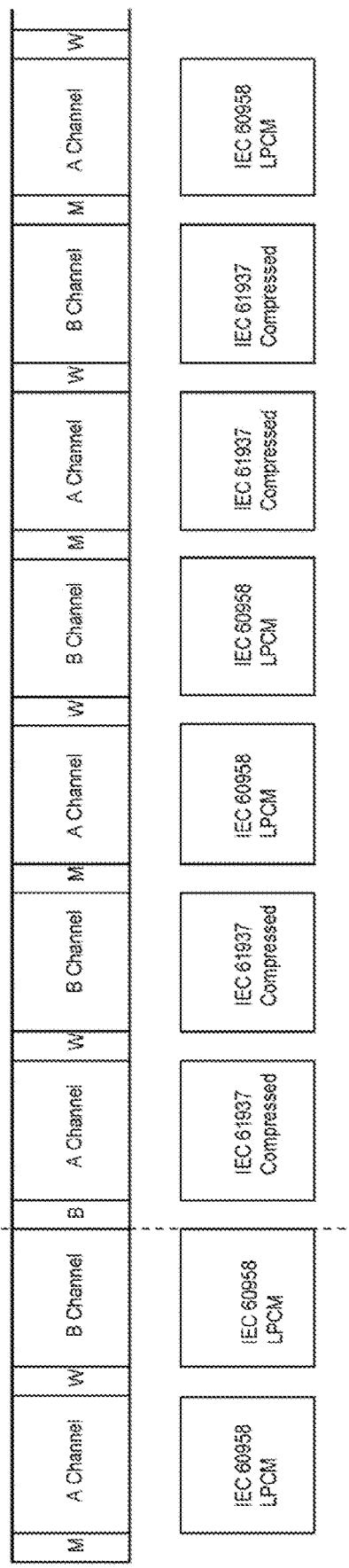
FIG. 26 is a view depicting an example of a frame configuration in a case where a compressed audio signal and a linear PCM signal are arranged alternately in frame units.

It is to be noted that, although the foregoing description is directed to an example in which a compressed audio signal and a linear PCM signal are arranged alternately in subframe units, a configuration in which a compressed audio signal and a linear PCM signal are arranged alternately in frame units is also possible. FIG. 26 depicts an example of a frame configuration in this case. In this case, a compressed audio signal is transmitted by the first B preamble and the next W preamble of a block, and a linear PCM signal is transmitted by the following M preamble and the next W preamble, whereafter such alternate transmission as just described is repeated.

Referring back to FIG. 21, reproduction control information is arranged in the two bits of the 61st bit and the 62nd bit. "00" indicates that there is no information. "01" indicates that the reproduction level of an audio signal obtained by decoding the compressed audio signal is to be set to −10 dB. "10" indicates that the reproduction level of the compressed audio signal is to be set to 0 dB. Further, "11" indicates that the audio signal of the center channel obtained by decoding the compressed audio signal is to be replaced with the linear PCM signal. It is to be noted that this definition of the reproduction control information is an example and is not restrictive.

Figures 27A, 27B:
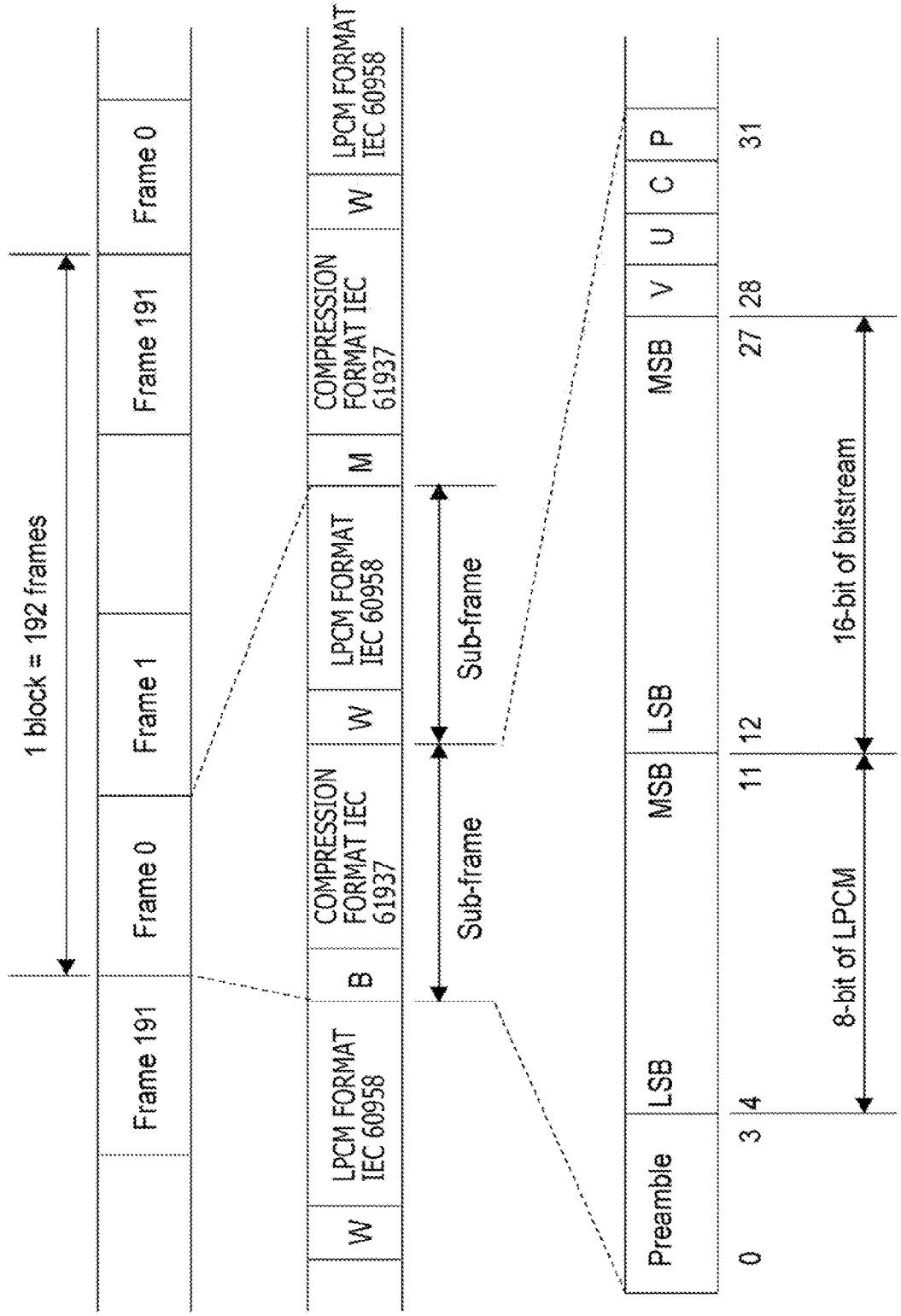
FIGS. 27A and 27B depicts views depicting an interface format in a case where both the first method and the second method are used.

It is to be noted that it is also possible to achieve increase of the number of channels capable of transmitting a linear PCM signal by applying both the first method and the second method described above. FIGS. 27A and 27B depicts an interface format in a case where both the first method and the second method are used. FIG. 27A depicts a frame configuration. One block includes 192 frames, and such blocks are arranged successively.

FIG. 27B indicates that each frame includes two subframes. In odd-numbered frames, a compressed audio format based on the IEC 61937-1 standard is stored, and, in even-numbered frames, an audio signal of the linear PCM format based on the IEC 60958 standard is stored.

Thus, in odd-numbered subframes in which the compressed audio format is stored, of the audio data region of the 24 bits from the fourth to 27th time slots, the upper 16 bits are used for transmission of the compressed audio signal, and the lower eight bits are used for transmission of the linear PCM signal.

"Third Method"

Details of the third method are described. In this case, the audio signal in a block is a mixture signal of a compressed audio signal and a linear PCM signal.

FIG. 28 schematically depicts a format of the channel status in a case where plural kinds of audio signals are transmitted simultaneously. The entire channel status includes the zeroth to 23rd bytes. a="0" of the zeroth bit indicates that the channel status is for consumer use. Meanwhile, b="1" of the first bit indicates that the channel state is for use for transmission of a compressed digital audio signal similarly to the case of the IEC 61937-1 interface format.

It is to be noted that the three bits of the third bit to the fifth bit are "000" in the conventional IEC 61937-1 interface format, and in order to identify that the mode is different from the mode of this, they are set to a different value. In the example depicted in FIG. 28, the three bits are "100."

Although the four bits of the 49th bit to the 52nd bit are "0000" in the conventional IEC 61937-1 interface format, they are set to a different value and represent identification information that indicates that the audio signal in the block is a mixture signal of plural kinds of audio signals. In the example depicted in FIG. 28, they are set to "1110." Further, when the four bits from the 49th bit to the 52nd bit indicate a mixture signal, the following eight bits from the 53rd bit to the 60th bit are valid.

These eight bits are configuration information indicative of a configuration of plural kinds of audio signals. FIG. 29 depicts an example of a correspondence relation between values of "Multichannel configuration value (MCV)" of the eight bits from the 53rd bit to the 60th bit and configurations of plural kinds of audio signals. For example, "01100000" indicates that the plural kinds of audio signals have the configuration of "48 kHz LPCM stream+48 kHz stream," that is, indicates that they include two kinds of audio signals of a linear PCM signal of the transfer rate of 48 kHz and a compressed audio signal of the transfer rate of 48 kHz.

FIG. 30 depicts an example of a frame configuration in this case. In this case, from the preamble B (block start) as a start point, two kinds of audio signals are switched for each frame. In this case, the overall transfer rate is 96 kHz. Although, in the example depicted in FIG. 30, the codec for the compressed audio signal is "AC-3," this is not restrictive.

Referring back to FIG. 28, in the two bits of the 61st bit and the 62nd bit, reproduction control information is arranged. "00" indicates that there is no information. "01" indicates that the reproduction level for an audio signal obtained by decoding the compressed audio signal is to be set to −10 dB. "10" indicate that the reproduction level for the compressed audio signal is to be set to 0 dB. Further, "11" indicates that an audio signal of the center channel obtained by decoding the compressed audio signal is to be replaced with the linear PCM signal. It is to be noted that the definition of the reproduction control information is an example and is not restrictive.

"Various Kinds of Information Relating to Linear PCM Signal"

As described hereinabove, to an audio signal to be transmitted from the SPDIF transmission circuit 104, various kinds of information relating to the linear PCM signal are added. In the present embodiment, the information is added, for example, using user bits.

FIG. 31 depicts an example of a user data message. This user data message includes 10 information units (IU). In the fourth bit to the zeroth bit of the second IU and the fifth bit to the second bit of the third IU, information of "IEC 61937-1 ID," that is, identification information indicative of the kind of information, is arranged. Further, in the first bit to the zeroth bit of the third IU and the fifth bit to the zeroth bit of the fourth to eighth IUs, an information field for four bytes is provided. It is to be noted that the information field is not limited to such four bytes.

FIG. 32 depicts an example of the information. For example, in a case where "IEC 61937-1 ID" is "10000000," this indicates that the information is language information of speech by the linear PCM signal. In this case, ASCII character information indicative of an abbreviation of a language name is arranged in the information field of four bytes. On the other hand, for example, in a case where "IEC 61937-1 ID" is "01000000," this indicates that the information is information indicative of a reproduction speaker position of sound by the linear PCM signal. In this case, in the information field of four bytes, information indicative of a channel number, an angle, a height, and a distance is arranged. It is to be noted that the information mentioned here is merely an example and this is not restrictive. By using such a user data message as depicted in FIG. 31, various kinds of information relating to a linear PCM signal can be sent to the reception side.

"Particular Examples of Reproduction Control by Reproduction Control Information"

A particular example of reproduction control with the reproduction control information is described. First, reproduction control in a case where reproduction level adjustment of a compressed audio signal is performed is described with reference to FIGS. 33A and 33B. FIG. 33A depicts an example of change in a time direction of reproduction control information of the two bits of the 61st bit and the 62nd bit of the channel status transmitted from the television receiver 100 to the audio amplifier 200. In the example depicted in FIG. 33A, the reproduction control information changes from "00," "10," "01," to "10," in this order.

FIG. 33B depicts an example of change in the time direction of reproduction level adjustment of a compressed audio signal on the basis of reproduction control information in the audio amplifier 200. During the period of "00," the reproduction level adjustment of the compressed audio signal is an optional process on the audio amplifier 200 side. During the next period of "10," the reproduction level of the compressed audio signal is adjusted to 0 dB. In other words, the adjustment for decreasing the reproduction level is not performed.

Further, during the next period of "01," the reproduction level of the compressed audio signal is adjusted to −10 dB. In other words, the reproduction level is adjusted so as to be decreased by 10 dB. This period of "01" corresponds to a period within which a linear PCM signal from the interphone 125, a linear PCM signal of operation sound of the remote controller 126, a linear PCM signal of mail reception notification sound, or the like is sent from the television receiver 100 to the audio amplifier 200 simultaneously together with a compressed audio signal. Further, during the next period of "10," the reproduction level of the compressed audio signal is adjusted to 0 dB.

Here, in a portion in which the reproduction control information changes from "10" to "01," the reproduction level of the compressed audio signal does not change rapidly from 0 dB to −10 dB but changes in a fade-out state in which the reproduction level gradually lowers. Similarly, in a portion in which the reproduction control information changes from "01" to "10," the reproduction level of the compressed audio signal does not change rapidly from −10 dB to 0 dB but changes in a fade-in state in which the reproduction level gradually rises. Accordingly, it is avoided that sudden sound volume change gives an uncomfortable feeling to the user.

By such reproduction level adjustment as described above, the reproduction level of the compressed audio signal is adjusted to a low level, and reproduction sound of a linear PCM signal from the interphone 125, a linear PCM signal of operation sound of the remote controller 126, a linear PCM signal of mail reception notification sound, or the like becomes outstanding to the user, by which the reproduction sound can be noticed by the user.

Now, reproduction level adjustment in a case where the center channel of a compressed audio signal is replaced with a linear PCM signal is described with reference to FIGS. 34A, 34B and 34C. FIG. 34A depicts an example change in the time direction of reproduction control information of the two bits of the 61st bit and the 62nd bit of the channel status transmitted from the television receiver 100 to the audio amplifier 200. In the example depicted in FIG. 34A, the reproduction control information changes from "00," "10," "11," to "10," in this order.

FIG. 34B depicts an example of change in the time direction of reproduction level adjustment of the center channel of a compressed audio signal on the basis of reproduction control information in the audio amplifier 200. During the period of "00," the reproduction level adjustment of the compressed audio signal is an optional process on the audio amplifier 200 side. During the next period of "10," the reproduction level of the compressed audio signal is adjusted to 0 dB. In other words, the adjustment for lowering the reproduction level is not performed.

Further, during the next period of "11," the reproduction level of the compressed audio signal is set to a mute state. During this period of "11," a linear PCM signal to be replaced into the center channel of the compressed audio signal is sent simultaneously with the compressed audio signal from the television receiver 100 to the audio amplifier 200.

FIG. 34C depicts a linear PCM signal to be replaced into the center channel of a compressed audio signal. This linear PCM signal changes from the mute state to a state of 0 dB during the period of "11" and then changes from the state of 0 dB to a mute state. Such level change of the linear PCM signal as just described is processed by the mixer 111, the sound synthesis circuit 109, and so forth of the television receiver 100 on the transmission side.

Further, during the next period of "10," the reproduction level of the compressed audio signal is adjusted to 0 dB.

As described above, since, during this period of "11," the reproduction level of the center channel of the compressed audio signal is set to a mute state and the reproduction level of the linear PCM signal is changed to 0 dB during this period, the center channel of the compressed audio signal is replaced with a linear PCM signal (for example, a linear PCM signal of singing voice in the karaoke mode, a linear PCM signal of different language speech in a Multilanguage content, or the like).

Here, a fade-out process or a fade-in process is performed for a portion in which the reproduction level of the center channel of the compressed audio signal changes and a portion of the level of the linear PCM signal of the replacement target changes, and it can be avoided that a sudden sound volume change gives an uncomfortable feeling to the user.

In particular, in a portion in which the reproduction control information changes from "10" to "11," the reproduction level of the center channel of the compressed audio signal does not change rapidly from 0 dB to a mute state but is set to a fade-out state in which the reproduction level gradually lowers. Similarly, in a portion in which the reproduction control information changes from "11" to "10," the reproduction level of the center channel of the compressed audio signal does not change rapidly from the mute state to 0 dB but is set to a fade-in state in which the reproduction level gradually rises.

Also in regard to the linear PCM signal of the replacement target, in a portion in which the reproduction level of the linear PCM signal changes from the mute state to 0 dB, the reproduction level of the linear PCM signal does not change rapidly from the mute state to 0 dB but is set to a ford-in state in which the reproduction level gradually rises. Similarly, in a portion in which the reproduction level of the linear PCM signal changes from 0 dB to the mute state, the reproduction level of the linear PCM signal does not change rapidly from 0 dB to the mute state but is placed into a ford-out state in which the reproduction level gradually lowers.

Now, reproduction level adjustment in a case in which the reproduction level of the compressed audio signal is lowered in response to a predetermined operation by the user is described with reference to FIGS. 35A, 35B and 35C. Here, a case in which the user performs an on/off operation of a particular button of the remote controller 126 is taken as an example.

FIG. 35A depicts an example of a timing at which the user performs an on/off operation of a particular button of the remote controller 126. FIG. 35B depicts an example of change in the time direction of reproduction control information of the two bits of the 61st bit and the 62nd bit of the channel status transmitted from the television receiver 100 to the audio amplifier 200 in response to the button operation. In the example depicted in FIG. 35B, the reproduction control information changes from "00," "10," "01," to "10," in this order. In this case, the reproduction control information is set to "01" during a period during which the particular button is in an on state.

FIG. 35C depicts an example of change in the time direction of reproduction level adjustment of the compressed audio signal on the basis of reproduction control information in the audio amplifier 200. During the period of "00," the reproduction level adjustment of the compressed audio signal is an optional process on the audio amplifier 200 side. During the next period of "10," the reproduction level of the compressed audio signal is adjusted to 0 dB. In other words, adjustment for lowering the reproduction level is not performed.

Further, during the next period of "01," the reproduction level of the compressed audio signal is adjusted to −10 dB. In other words, the reproduction level is adjusted so as to be lowered by 10 dB. This period of "01" corresponds to a period during which the user sets the particular button of the remote controller 126 to an on state, as described above. Moreover, during the next period of "10," the reproduction level of the compressed audio signal is adjusted to 0 dB.

Here, in a portion in which the reproduction control information changes from "10" to "01," the reproduction level of the compressed audio signal does not change rapidly from 0 dB to −10 dB but is set to a fade-out state in which the reproduction level gradually lowers. Similarly, in a portion in which the reproduction control information changes from "01" to "10," the reproduction level of the compressed audio signal does not change rapidly from −10 dB to 0 dB but is set to a fade-in state in which the reproduction level gradually rises. Accordingly, it is avoided that sudden sound volume change gives an uncomfortable feeling to the user.

In such a manner, by a predetermined operation by the user, for example, by an operation for setting a particular button of a remote controller to an on state, the reproduction level of the compressed audio signal is lowered, and it can be avoided temporarily that reproduction sound of the compressed audio signal bothers the user.

For example, it is assumed that a family of plural people is watching a movie together in a home. It is assumed that an image is reproduced by the television receiver 100 and sound is reproduced by the audio amplifier 200, and that the family is enjoying multichannel surround sound. Although the wife remembers some errand and tries to talk to the husband, the sound volume of the multichannel surround sound is so loud that the husband is not aware of being spoken to. However, the errand is not so significant as to interrupt the reproduction of the movie. In such a case as just described, the wife can continue to depress a "compressed sound reproduction level lowering" button of the remote controller 126 to temporarily lower the reproduction sound volume of the compressed audio signal such that the voice of the wife can be heard by the husband to thereby make good conversation possible.

As described hereinabove, in the AV system 10 depicted in FIG. 1, when an audio signal (SPDIF signal including a compressed audio signal and a linear PCM signal simultaneously is to be transmitted from the television receiver 100 to the audio amplifier 200, reproduction control information is added to the audio signal. Therefore, the audio amplifier 200 can favorably perform reproduction control of the compressed audio signal and/or the linear PCM signal on the basis of the reproduction control information.

2. Modifications

It is to be noted that, in the embodiment described above, as an example of reproduction control, (1) control of lowering the reproduction level adjustment of a compressed audio signal to be reproduced simultaneously with a linear PCM signal, (2) control of replacing the center channel of the compressed audio signal with the linear PCM signal, (3) control of lowering the reproduction level of the compressed audio signal during a period during which a predetermined operation is being performed by the user, (4) control of localizing sound of a linear PCM signal to be reproduced simultaneously with a compressed audio signal in the proximity of the user, (5) control of setting the reproduction speaker for a linear PCM signal to be reproduced simultaneously with a compressed audio signal to an at-hand speaker of the user, and so forth are given hereinabove. However, the example of reproduction control to which the present technology is applied is not restricted to them.

Further, although, in the embodiment described above, an example in which the reproduction control information is information of two bits and is arranged in a region of the two bits of the 61st bit and the 62nd bit of the channel status is indicated, the arrangement position and the number of information bits are not restricted to them. Further, for the arrangement position, a region other than the channel status, that is, a predetermined bit region in a block, may be used.

Further, although the embodiment described above indicates an example in which HDMI ARC is used as an IEC 60958 transmission line, an example in which a coaxial cable or an optical cable is used as the IEC 60958 transmission line is also possible. Moreover, an example in which an HDMI transmission line is used as the IEC 60958 transmission line is also possible. In this case, the SPDIF signal (IEC 60958 signal) is mapped to an audio sample packet and transmitted in a forward direction same as that in video transmission. Similarly, an example in which the IEC 61883-6 transmission line, the MHL transmission line, the display port transmission line (DP transmission line), and so forth are used as the IEC 60958 transmission line is also possible. Also in those cases, the SPDIF signal (IEC 60958 signal) is mapped to an audio sample packet and is transmitted in a forward direction same as that in video transmission.

Further, although the preferred embodiment of the present disclosure has been described in detail with reference to the accompanying drawings, the technical scope of the present disclosure is not limited to such an example as described above. It is apparent that those who have ordinary knowledge in the technical field of the present disclosure can easily conceive of various alterations or modifications within the scope of the technical idea described in the claims, and it is construed that such alterations or modifications also naturally belong to the technical scope of the present disclosure.

Further, the advantageous effects described in the present specification are merely explanatory or exemplary to the last and are not restrictive. In other words, the technology according to the present disclosure can exhibit other advantageous effects apparent to those skilled in the art from the description of the present specification together with the advantageous effects described above or in place of the advantageous effects described above.

Further, the technology can also assume such configurations as described below.

(1)
A transmission device including:
a transmission section that sequentially transmits an audio signal of predetermined units to a reception side through a predetermined transmission line,
the audio signal of the predetermined units including a mixture signal of a compressed audio signal and a linear PCM signal,
the transmission device further including an information addition section that adds, to the audio signal to be transmitted, reproduction control information for the audio signal.

(2)
The transmission device according to (1) above, in which the reproduction control information includes information for controlling reproduction level adjustment of an audio signal obtained by decoding the compressed audio signal.

(3)
The transmission device according to claim 1, in which the reproduction control information includes information for performing control to replace an audio signal of a center channel obtained by decoding the compressed audio signal with the linear PCM signal.

(4)
The transmission device according to claim 1, in which the reproduction control information includes information for performing control to lower a reproduction level of an audio signal obtained by decoding the compressed audio signal in response to a predetermined operation by a user.

(5)
The transmission device according to claim 1, in which the reproduction control information includes information for controlling such that a localization position of a sound image according to the linear PCM signal is localized at a position in a proximity of a user.

(6)
The transmission device according to claim 1, in which the reproduction control information includes information for controlling such that an at-hand speaker of a user is used as a reproduction speaker for the linear PCM signal.

(7)
The transmission device according to any one of (1) to (6) above, in which
the information addition section adds the reproduction control information with use of a predetermined bit region in each of blocks configured for each predetermined number of the predetermined units.

(8)
The transmission device according to (7) above, in which the predetermined bit region in each of the blocks includes a predetermined bit region of a channel status of each of the blocks.

(9)
The transmission device according to any one of (1) to (8) above, further including:
a display section for displaying information relating to the reproduction control information.

(10)
The transmission device according to any one of (1) to (9) above, in which
the audio signal of the predetermined units includes an audio signal of subframe units.

(11)
The transmission device according to (10) above, in which,
in the audio signal of the subframe units, the compressed audio signal is arranged on an upper bit side, and the linear PCM signal is arranged on a lower bit side.

(12)
The transmission device according to any one of (1) to (11) above, in which
the linear PCM signal includes an audio signal that requires a real time property.

(13)
The transmission device according to any one of (1) to (12) above, further including:
an information addition section that adds, to the audio signal to be transmitted, identification information that indicates that the audio signal of the predetermined units includes a mixture signal of a compressed audio signal and a linear PCM signal.

(14)
The transmission device according to any one of (1) to (13) above, in which
the predetermined transmission line includes a coaxial cable, an optical cable, an Ethernet (IEC 61883-6) cable, an HDMI cable, an MHL cable, or a display port cable.

(15)
A transmission method including:
a procedure of sequentially transmitting an audio signal of predetermined units to a reception side through a predetermined transmission line,
the audio signal of the predetermined units including a mixture signal of a compressed audio signal and a linear PCM signal,
the transmission method further including a procedure of adding, to the audio signal to be transmitted, reproduction control information for the audio signal.

(16)
A reception device including:
a reception section that receives an audio signal of predetermined units transmitted sequentially from a transmission side through a predetermined transmission line,
the audio signal of the predetermined units including a mixture signal of a compressed audio signal and a linear PCM signal,
to the audio signal received, reproduction control information for the audio signal being added,
the reception device further including a reproduction controlling section that controls reproduction of the compressed audio signal and/or the linear PCM signal on the basis of the reproduction control information.

(17)
The reception device according to (16) above, further including:
a display section for displaying information relating to the reproduction control information.

(18)
A reception method including:
a procedure of receiving an audio signal of predetermined units transmitted sequentially from a transmission side through a predetermined transmission line,
the audio signal of the predetermined units including a mixture signal of a compressed audio signal and a linear PCM signal,
to the audio signal received, reproduction control information for the audio signal being added,
the reception method further including a procedure of controlling reproduction of the compressed audio signal and/or the linear PCM signal on the basis of the reproduction control information.

REFERENCE SIGNS LIST

10: AV system
100: Television receiver
101: HDMI terminal
102: HDMI reception section
103: High speed bus interface
104: SPDIF transmission circuit
105: System controller
107: Digital broadcast reception circuit
108: Content reproduction circuit
109: Sound synthesis circuit
110: Ethernet interface
111: Mixer
112: Overlay circuit
113: Display
121: Reception antenna
122: BD player
123: Internet
124: Microphone
125: Interphone
126: Remote controller
200: Audio amplifier
201: HDMI terminal
202: HDMI transmission section
203: High speed bus interface
204: SPDIF reception circuit
205: System controller
206: Compressed audio decoding circuit
207: Audio mixer
208: Amplifier
209: Display section
210: Ethernet interface
211: Digital signal processor
250: Speaker system
251: At-hand speaker system
300: HDMI cable

The invention claimed is:
1. A transmission device, comprising:
circuitry configured to:
acquire a compressed audio signal and a linear PCM signal;
add, to a first audio signal of predetermined units, identification information, configuration information, and reproduction control information for the first audio signal, wherein
the first audio signal includes a mixture signal of the compressed audio signal and the linear PCM signal,
the identification information indicates a configuration of the first audio signal, and
the configuration information indicates a configuration of the linear PCM signal; and
sequentially transmit, through a transmission line, the first audio signal to a reception side.

2. The transmission device according to claim 1, wherein
the reproduction control information includes information to control reproduction level adjustment of a second audio signal, and
the second audio signal is obtained after the compressed audio signal is decoded at the reception side.

3. The transmission device according to claim 1, wherein
the reproduction control information includes information to control replacement of a second audio signal of a center channel with the linear PCM signal, and
the second audio signal is obtained after the compressed audio signal is decoded at the reception side.

4. The transmission device according to claim 1, wherein
the reproduction control information includes information to control adjustment of a reproduction level of a second audio signal,
the reproduction level is adjusted in response to an operation by a user, and
the second audio signal is obtained after the compressed audio signal is decoded at the reception side.

5. The transmission device according to claim 1, wherein
the reproduction control information includes information to control, based on the linear PCM signal, a localization position of a sound image, and
the localization position of the sound image is localized at a position in a proximity of a user.

6. The transmission device according to claim 1, wherein
the reproduction control information includes information to control an at-hand speaker of a user, and
the at-hand speaker is used as a reproduction speaker for the linear PCM signal.

7. The transmission device according to claim 1, wherein
the circuitry is further configured to add the reproduction control information using a predetermined bit region in each block of a plurality of blocks, and
each block of the plurality of blocks is configured for each predetermined unit of the predetermined units.

8. The transmission device according to claim 7, wherein
the predetermined bit region, in each block of the plurality of blocks, includes a predetermined bit region of a channel status of each block of the plurality of blocks.

9. The transmission device according to claim 1, wherein
the circuitry is further configured to display information related to the reproduction control information.

10. The transmission device according to claim 1, wherein the first audio signal of the predetermined units includes an audio signal of subframe units.

11. The transmission device according to claim 10, wherein, in the audio signal of the subframe units, the compressed audio signal is arranged on an upper bit side of the subframe units, and the linear PCM signal is arranged on a lower bit side of the subframe units.

12. The transmission device according to claim 1, wherein the linear PCM signal includes an audio signal that requires a real time property.

13. The transmission device according to claim 1,
wherein the identification information further indicates that the first audio signal includes the mixture signal of the compressed audio signal and the linear PCM signal.

14. The transmission device according to claim 1, wherein the transmission line includes one of a coaxial cable, an optical cable, an Ethernet (IEC 61883-6) cable, a High-Definition Multimedia Interface (HDMI) cable, a Mobile High-Definition Link (MHL) cable, or a display port cable.

15. A transmission method, comprising:
acquiring a compressed audio signal and a linear PCM signal;
adding, to an audio signal of predetermined units, identification information, configuration information, and reproduction control information for the audio signal, wherein
the audio signal includes a mixture signal of the compressed audio signal and the linear PCM signal,
the identification information indicates a configuration of the audio signal, and
the configuration information indicates a configuration of the linear PCM signal; and
sequentially transmitting, through a transmission line, the audio signal to a reception side.

16. A reception device, comprising:
circuitry configured to:
receive, through a transmission line, an audio signal of predetermined units from a transmission side, wherein
the audio signal is transmitted sequentially from the transmission side,
the audio signal includes a mixture signal of a compressed audio signal and a linear PCM signal,
to the received audio signal, identification information, configuration information, and reproduction control information for the audio signal is added,
the identification information indicates a configuration of the audio signal, and
the configuration information indicates a configuration of the linear PCM signal; and
control, based on the reproduction control information, reproduction of at least one of the compressed audio signal or the linear PCM signal.

17. The reception device according to claim 16, wherein the circuitry is further configured to a display information related to the reproduction control information.

18. A reception method, comprising:
receiving, through a transmission line, an audio signal of predetermined units from a transmission side, wherein
the audio signal is transmitted sequentially from the transmission side,
the audio signal includes a mixture signal of a compressed audio signal and a linear PCM signal,
to the received audio signal, identification information, configuration information, and reproduction control information for the audio signal is added,
the identification information indicates a configuration of the audio signal, and
the configuration information indicates a configuration of the linear PCM signal; and
controlling, based on the reproduction control information, reproduction of at least one of the compressed audio signal or the linear PCM signal.

19. A transmission device, comprising:
circuitry configured to:
acquire a compressed audio signal and a linear PCM signal;
add reproduction control information to an audio signal of predetermined units, wherein
the audio signal includes a mixture signal of the compressed audio signal and the linear PCM signal,
the audio signal of the predetermined units includes an audio signal of subframe units, and
in the audio signal of the subframe units, the compressed audio signal is arranged on an upper bit side of the subframe units, and the linear PCM signal is arranged on a lower bit side of the subframe units; and sequentially transmit, through a transmission line, the audio signal of the predetermined units to a reception side.

\* \* \* \* \*